US 10,092,098 B2

(12) United States Patent
Jackson et al.

(10) Patent No.: US 10,092,098 B2
(45) Date of Patent: Oct. 9, 2018

(54) MOUNTING AND LATCHING ARRANGEMENTS FOR SECURING CARTS

(71) Applicant: Cannon Equipment LLC, Cannon Falls, MN (US)

(72) Inventors: Keith Edward Jackson, Minneapolis, MN (US); Clemance Bernard Finstad, Bay City, WI (US)

(73) Assignee: Cannon Equipment LLC, Cannon Falls, MN (US)

( * ) Notice: Subject to any disclaimer, the term of this patent is extended or adjusted under 35 U.S.C. 154(b) by 162 days.

(21) Appl. No.: 15/222,215

(22) Filed: Jul. 28, 2016

(65) Prior Publication Data

US 2017/0258222 A1 Sep. 14, 2017

Related U.S. Application Data

(60) Provisional application No. 62/307,746, filed on Mar. 14, 2016.

(51) Int. Cl.
*B60P 7/08* (2006.01)
*A47B 81/00* (2006.01)
*F16M 13/02* (2006.01)

(52) U.S. Cl.
CPC ............. *A47B 81/00* (2013.01); *F16M 13/02* (2013.01)

(58) Field of Classification Search
CPC ......... B60P 7/08; B60P 7/0807; B60P 7/0815; B60P 7/10; B60P 1/64; B60P 1/6409; B60P 3/007; B61D 45/001; B61D 45/002; B61D 45/007

USPC ................ 410/7, 8, 31–33, 66, 69, 84, 104; 414/401, 402, 498
See application file for complete search history.

(56) References Cited

U.S. PATENT DOCUMENTS

| | | | |
|---|---|---|---|
| 1,518,497 A | 12/1924 | Flood et al. | |
| 2,598,800 A | 6/1952 | Kopper | |
| 2,647,287 A | 8/1953 | Jones | |
| 2,950,126 A * | 8/1960 | Armentrout ............ | B60P 3/073 410/66 |
| 3,191,959 A | 6/1965 | Heimbruch et al. | |
| 3,197,224 A | 7/1965 | Kappen | |
| 3,272,528 A | 9/1966 | Young et al. | |
| 3,519,286 A | 7/1970 | Anderson | |
| 3,628,805 A | 12/1971 | Archer | |
| 3,840,242 A | 10/1974 | Craig, Sr. et al. | |
| 3,971,568 A | 7/1976 | Wright | |
| 3,977,689 A | 8/1976 | Rosa | |
| 3,981,510 A | 9/1976 | Gustafsson | |
| 3,984,117 A * | 10/1976 | Bates ....................... | B60P 7/08 410/66 |
| 4,045,043 A | 8/1977 | Fourrey | |

(Continued)

*Primary Examiner* — Hilary L Gutman
(74) *Attorney, Agent, or Firm* — Andrus Intellectual Property Law, LLP

(57) ABSTRACT

A mounting and latching arrangement is provided for locking and unlocking a cart relative to a support structure. The mounting and latching arrangement includes an elongated mounting channel having opposed ends configured with mounting bracket assemblies adapted to be secured to the support surface, and one of engagement structure and latching structure located between the mounting bracket assemblies and configured for selective engagement and disengagement with the cart for enabling locking and unlocking thereof relative to the elongated mounting channel.

16 Claims, 23 Drawing Sheets

(56) References Cited

U.S. PATENT DOCUMENTS

| | | | |
|---|---|---|---|
| 4,065,141 A | 12/1977 | Wilson | |
| 4,097,097 A | 6/1978 | Hosko | |
| 4,263,749 A | 4/1981 | McDougle | |
| 4,344,368 A | 8/1982 | Remington et al. | |
| 4,346,906 A | 8/1982 | Thorpe | |
| 4,456,273 A | 6/1984 | McKinnon | |
| 4,542,806 A | 9/1985 | Olson | |
| 4,678,090 A | 7/1987 | Ross | |
| 4,694,962 A | 9/1987 | Taub | |
| 4,895,382 A | 1/1990 | Andersson | |
| 4,986,555 A | 1/1991 | Andreen | |
| 5,105,746 A | 4/1992 | Reynolds | |
| 5,139,385 A | 8/1992 | Chase et al. | |
| 5,263,701 A | 11/1993 | Kleinhen | |
| 5,524,917 A | 6/1996 | Iverson et al. | |
| 5,562,047 A | 10/1996 | Forney et al. | |
| 5,765,702 A | 6/1998 | Bustos et al. | |
| 5,860,369 A | 1/1999 | John et al. | |
| 5,871,108 A | 2/1999 | White | |
| 5,873,204 A | 2/1999 | Gehn et al. | |
| 5,947,494 A | 9/1999 | Thogersen et al. | |
| 6,234,087 B1 | 5/2001 | Brown | |
| 6,331,009 B1 | 12/2001 | Wilkinson | |
| 6,364,141 B1 * | 4/2002 | Ehrgott | A47F 5/0823 211/103 |
| 6,402,167 B1 | 6/2002 | Calleja | |
| 6,786,494 B2 | 9/2004 | Garbiso | |
| 6,874,981 B1 * | 4/2005 | Krawczyk | B60P 7/13 410/66 |
| 6,974,042 B2 | 12/2005 | Hall | |
| 6,986,527 B2 | 1/2006 | Carver | |
| 7,025,548 B2 | 4/2006 | Krawczyk et al. | |
| 7,131,543 B2 | 11/2006 | Mason | |
| 7,185,899 B2 | 3/2007 | Thiede et al. | |
| 7,213,816 B2 | 5/2007 | Gregory et al. | |
| 7,320,472 B2 | 1/2008 | Gregory et al. | |
| 7,360,493 B2 | 4/2008 | Hummel et al. | |
| 7,419,063 B1 | 9/2008 | Hall | |
| 7,506,879 B1 * | 3/2009 | Frahm | B60P 1/64 14/2.4 |
| 7,993,095 B2 | 8/2011 | Reichler | |
| 8,528,918 B2 | 9/2013 | Macias | |
| 8,567,795 B2 | 10/2013 | Megens | |
| 8,931,420 B2 | 1/2015 | Larson | |
| 2001/0026743 A1 * | 10/2001 | Krawczyk | B60P 3/055 410/66 |
| 2002/0101049 A1 * | 8/2002 | Krawczyk | B60P 3/055 280/79.3 |
| 2002/0117464 A1 * | 8/2002 | Ehrgott | A47F 5/0823 211/189 |
| 2002/0117465 A1 * | 8/2002 | Ehrgott | A47F 5/0823 211/189 |
| 2004/0067129 A1 * | 4/2004 | Krawczyk | B60P 3/055 414/801 |
| 2005/0235885 A1 | 10/2005 | Salmanson et al. | |
| 2006/0213402 A1 | 9/2006 | Grimal | |
| 2011/0031259 A1 | 2/2011 | Megens | |
| 2013/0001904 A1 | 1/2013 | Macias | |
| 2016/0082996 A1 | 3/2016 | Jackson et al. | |
| 2017/0166103 A1 * | 6/2017 | Eichstedt | B60P 7/08 |
| 2017/0217358 A1 * | 8/2017 | Paunov | A47B 43/00 |

* cited by examiner

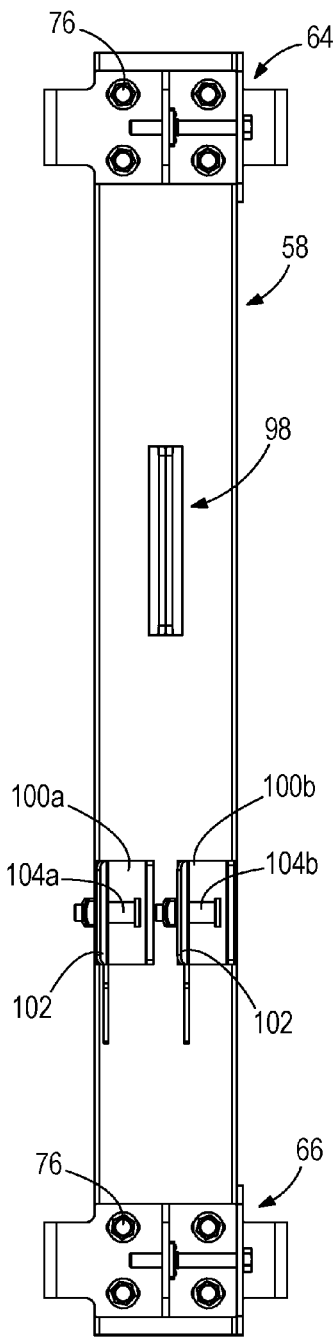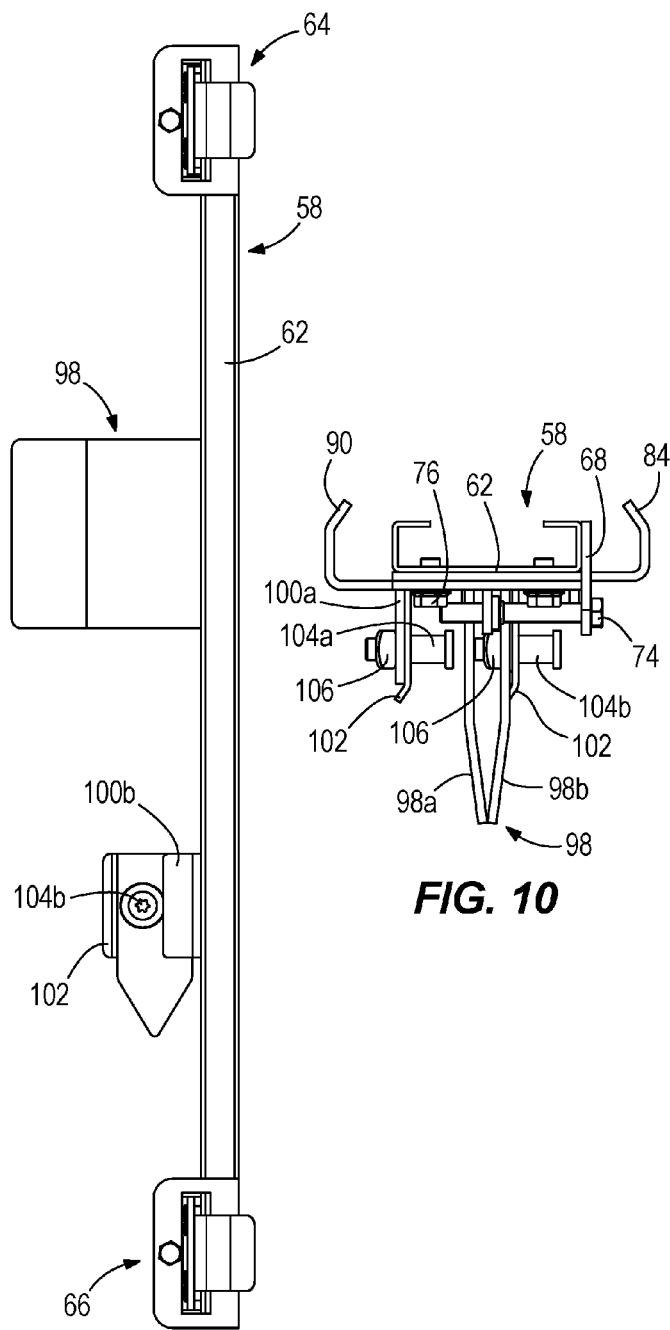
FIG. 8  FIG. 9  FIG. 10

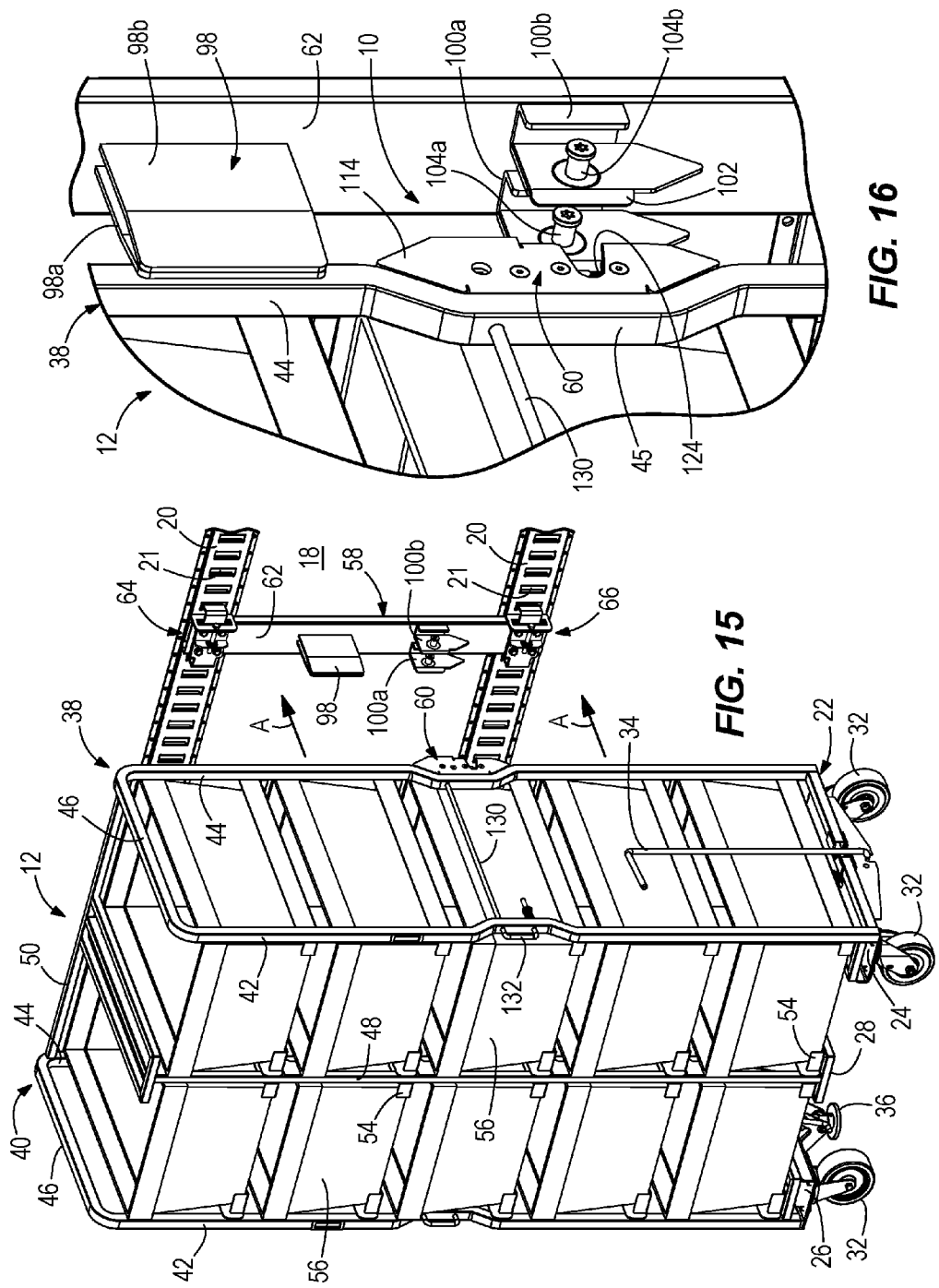

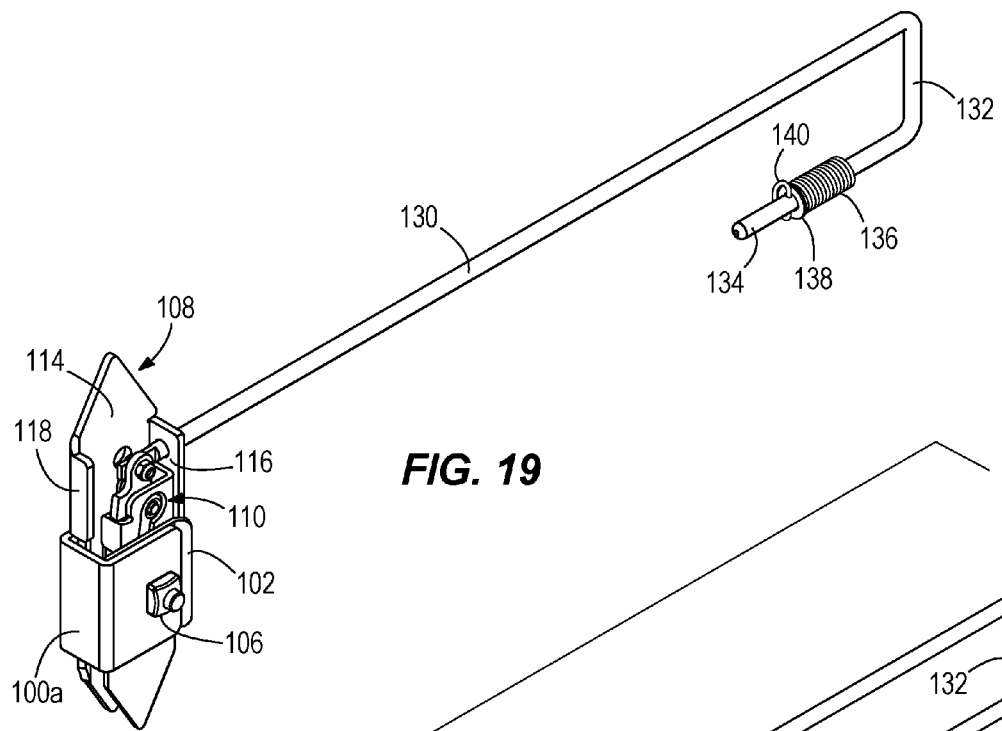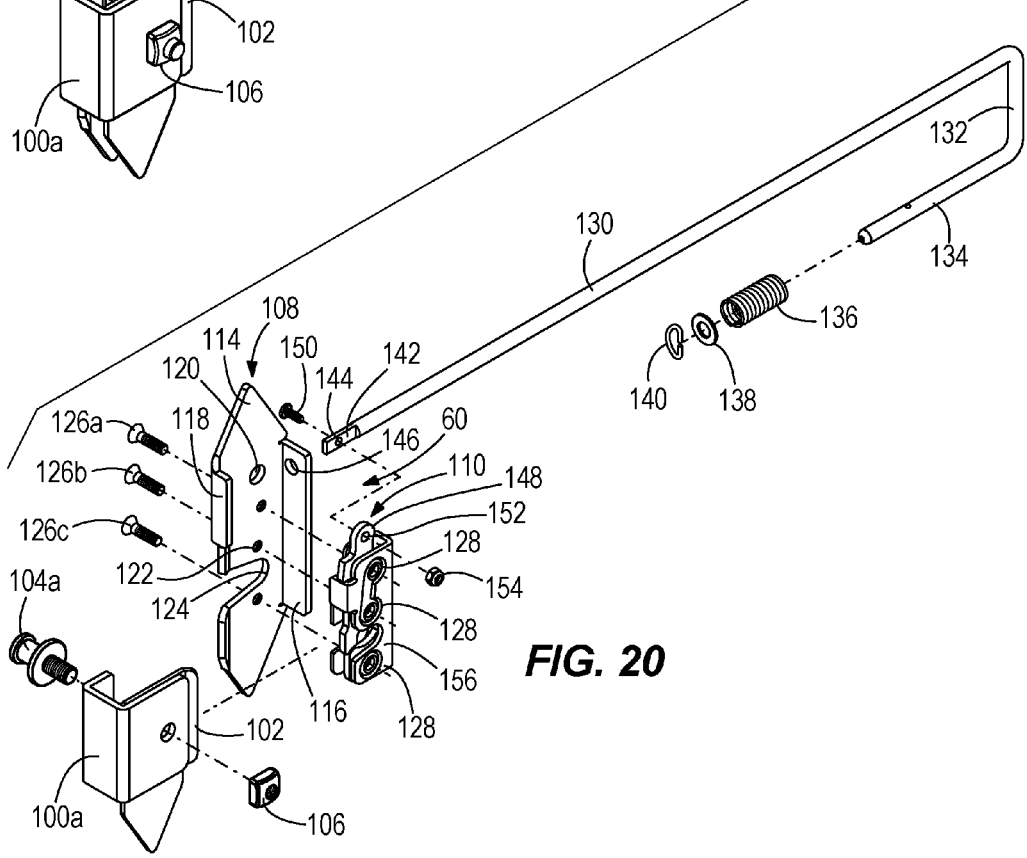

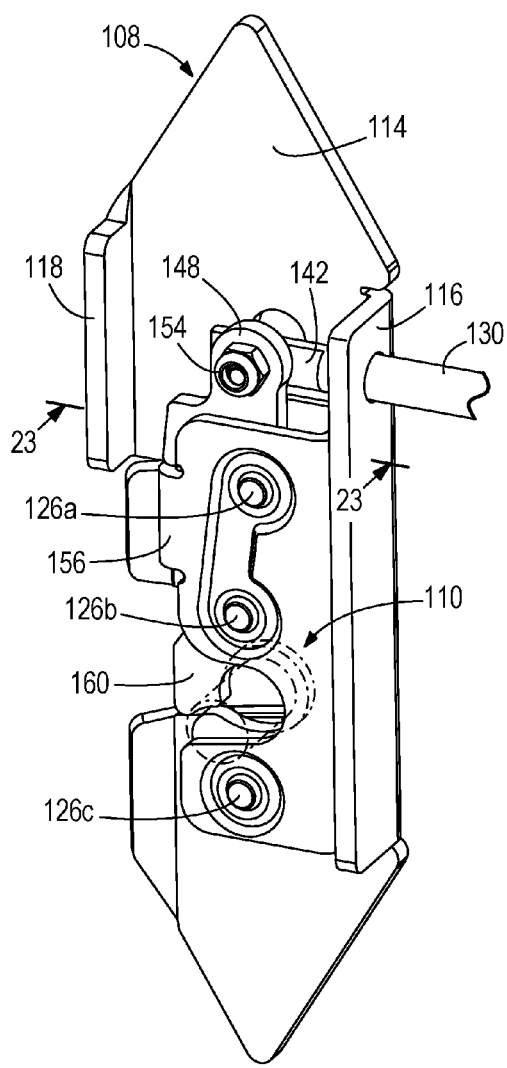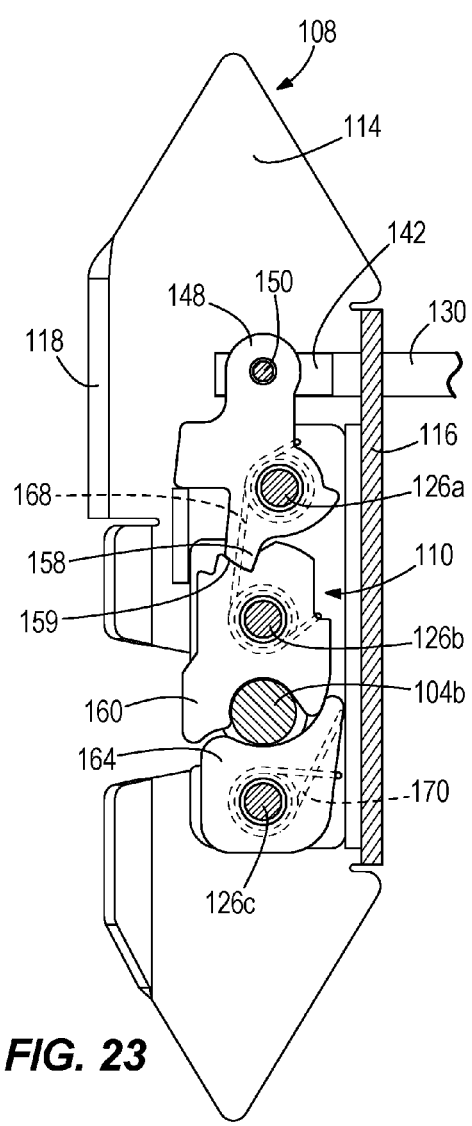
FIG. 22
FIG. 23

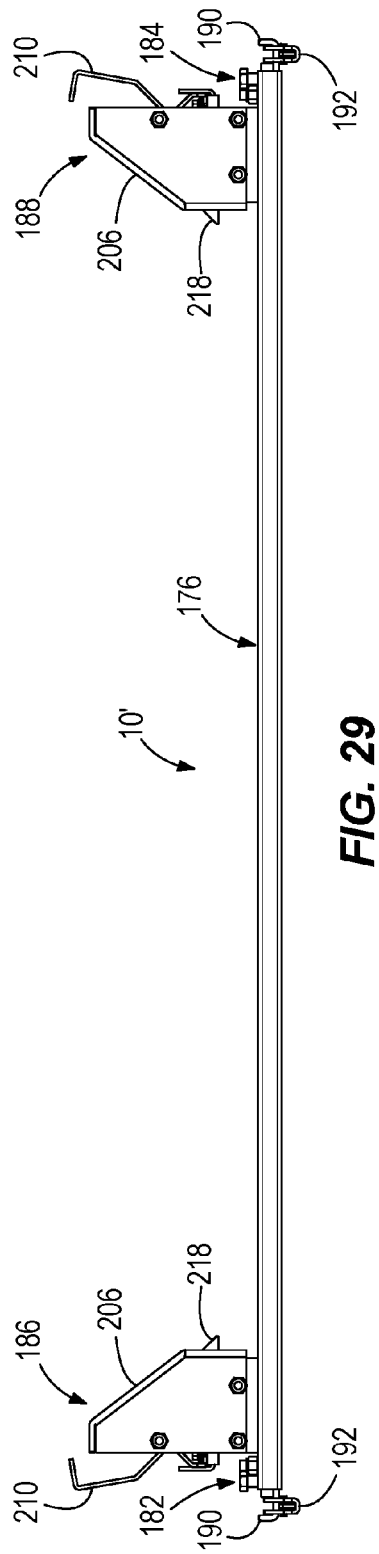
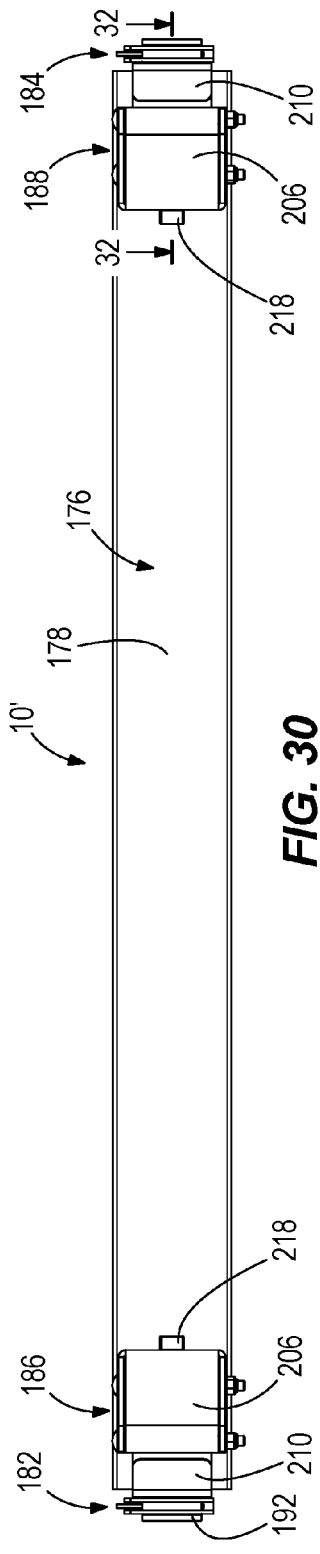

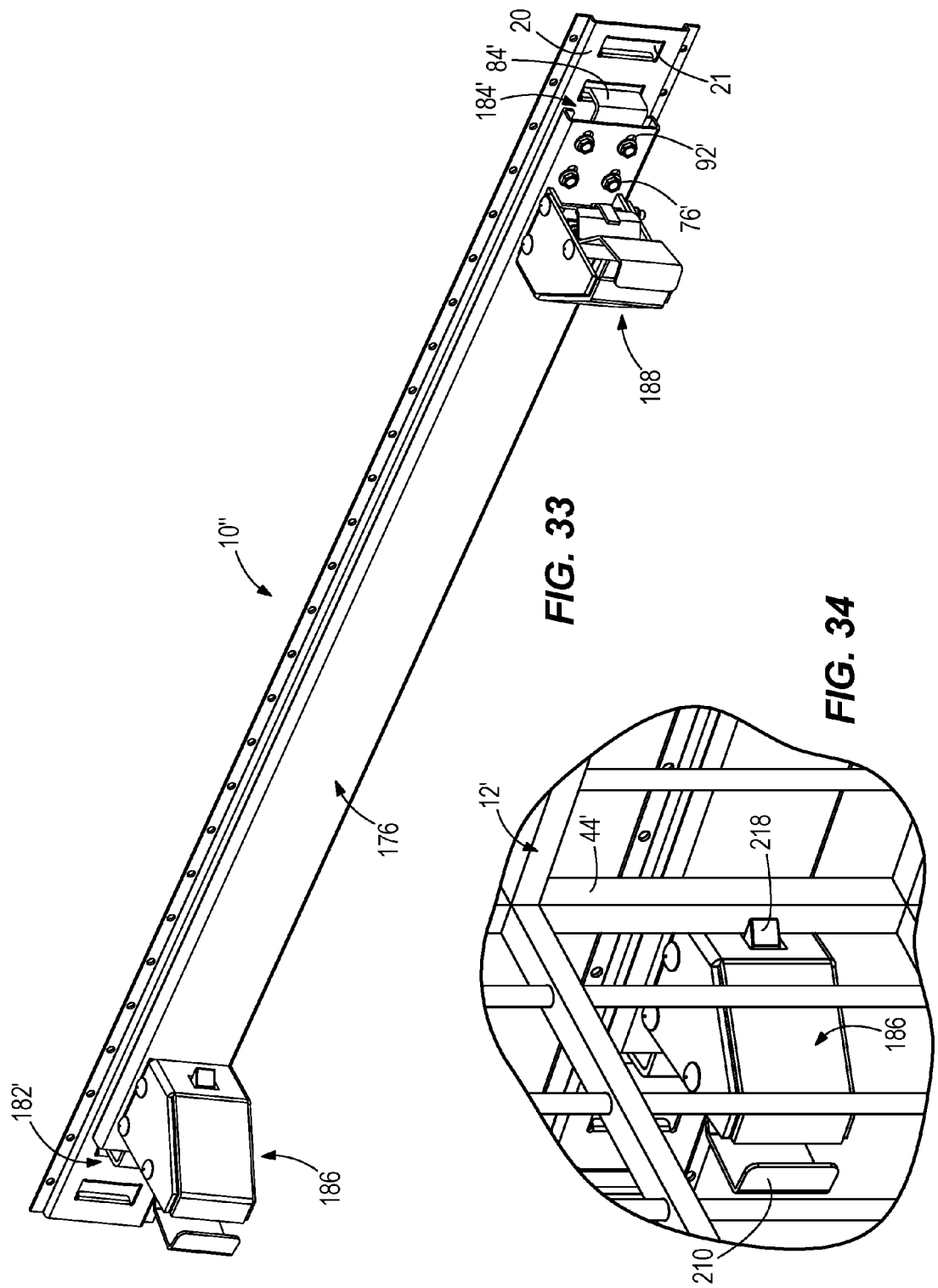

MOUNTING AND LATCHING ARRANGEMENTS FOR SECURING CARTS

CROSS-REFERENCE TO RELATED APPLICATION

The present utility application relates to and claims priority of U.S. Provisional Patent Application Ser. No. 62/307,746, filed Mar. 14, 2016, the disclosure of which is incorporated herein by reference in entirety.

FIELD

The present disclosure relates to various arrangements for securing carts to support surfaces. More particularly, the present disclosure pertains to mounting and latching arrangements for conveniently locking and unlocking carts relative to a support surface, such as within a vehicle.

BACKGROUND

U.S. Patent Application Publication No. 2016/0082996, published Mar. 24, 2016, which is herein incorporated by reference in entirety, discloses a security cart which includes a rear wall, a wheeled base frame connected to the rear wall and a base shelf pivotable between a horizontal position and a raised position. A first side wall and a first door pivotally connected to the first side wall are movable from locked positions within the base shelf to a folded position forwardly of the rear wall. A second side wall and a second door pivotally connected to the second side wall are movable from locked positions to a folded position forwardly of the folded first side wall and the first door. The base shelf is movable from the horizontal position to the raised position, and retained against the folded first side wall and the first door, and the folded second side wall and the second door. E-straps are provided on the first and second side walls for securing the security cart within a truck.

SUMMARY

The present inventors have determined through research and development that a need exists to design and construct mounting and latching arrangements that provide enhancements in securement of carts, for example without the use of straps, relative to a support surface such as may be provided on or by an inside wall of a vehicle such as a truck or railroad car.

According to certain examples, a mounting and latching arrangement is provided for locking and unlocking a cart relative to a support surface. The mounting and latching arrangement includes an elongated mounting channel having opposed ends configured with mounting bracket assemblies adapted to be secured to the support surface, and one of engagement structure and latching structure located between the mounting bracket assemblies and configured for selective engagement and disengagement with the cart for enabling locking and unlocking thereof relative to the elongated mounting channel.

According to other examples, a mounting and latching arrangement is provided for locking and unlocking a cart relative to a support surface. The cart has at least a base frame and a pair of opposed side members mounted on the base frame. The mounting and latching arrangement includes at least one pair of spaced apart elongated vertical mounting channels. Each vertical mounting channel has opposed ends provided with mounting bracket assemblies adapted to be attached to the support surface. Each vertical mounting channel further includes a lead-in guide element configured for guiding engagement with one of the side members of the cart, and a slam latch bracket configuration provided with striker structure. A latch assembly is provided on each of the side members of the cart, and is configured for selective engagement with and disengagement from the striker structure on one of the vertical mounting channels. The latch assembly is operatively connected with a release arrangement. Movement of the cart towards and between the vertical mounting channels causes guiding engagement of the side members of the cart with the lead-in guide elements, and locking engagement between the latch assemblies on the side members and the striker structure on each of the vertical mounting channels. Actuation of the release arrangement on the side members enables unlocking disengagement between the latch assemblies and the striker structure to free the cart from the vertical mounting channels.

According to further examples, a mounting and latching arrangement is provided for locking and unlocking a cart relative to a support surface. The cart has at least a base frame and a pair of opposed side members mounted on the base frame. The mounting and latching arrangement includes an elongated horizontal mounting channel having opposed ends provided with mounting bracket assemblies adapted to be attached to the support surface, and latch housing assemblies, each latch housing assembly having a latch housing bracket and a latch assembly including a latch element configured for selective engagement and disengagement from one of the side members of the cart, and a release arrangement operatively connected to each latch housing bracket. Movement of the cart towards the horizontal mounting channel between the latch housing assemblies causes locking engagement between the latch element and the side members of the cart to secure the cart relative to the horizontal mounting channel. Actuation of the release arrangement on the latch housing brackets enables unlocking disengagement of the side members of the cart from the latch elements to free the cart from the horizontal mounting channel.

According to additional examples, a mounting and latching arrangement is provided for locking and unlocking a cart relative to a support surface. The mounting and latching arrangement includes a mounting bracket assembly adapted to be attached to the support surface. The mounting bracket assembly is connected with engagement structure configured for selective engagement and disengagement with the cart, and is adapted for enabling locking and unlocking of the cart relative to the support surface.

BRIEF DESCRIPTION OF THE DRAWINGS

The present disclosure references the following Figures. The same numbers are used throughout the Figures to reference like features and like components.

FIG. 8 is a front view of the assembled mounting, guiding and receiving structure shown in FIG. 7.

FIG. 9 is a side elevational view of the mounting, guiding and receiving structure shown in FIG. 8.

FIG. 10 is a top view of the mounting, guiding and receiving structure shown in FIG. 8.

FIG. 15 is a front perspective view illustrating the movement of a cart using the mounting and latching arrangement when it is desired to lock the cart to the support structure.

FIG. 16 is an enlarged detail view of the mounting and latching arrangement as the cart of FIG. 15 is further moved towards the mounting and latching arrangement.

FIG. 19 is an isolated view of a release arrangement used in the mounting and latching arrangement.

FIG. 20 is an exploded view of the release arrangement shown in FIG. 19.

FIG. 22 is a side perspective view of one of the latch brackets and the latch assemblies.

FIG. 23 is a sectional view of the latch bracket and the latch assembly taken on line 23-23 of FIG. 22.

FIG. 29 is a bottom view of the mounting and latching arrangement of FIG. 27.

FIG. 30 is a front view of the mounting and latching arrangement of FIG. 27.

FIG. 33 is a front perspective view of a third embodiment of a mounting and latching arrangement.

FIG. 34 is an enlarged detail view depicting the locking of a cart using the mounting and latching arrangement of FIG. 33.

DETAILED DESCRIPTION OF THE DRAWINGS

FIGS. 1-26 illustrate a first exemplary embodiment of a mounting and latching arrangement 10 of the present disclosure for locking and unlocking at least one cart 12, and preferably a series of carts 12 in side by side relationship, relative to a support structure 14.

Figure 1:
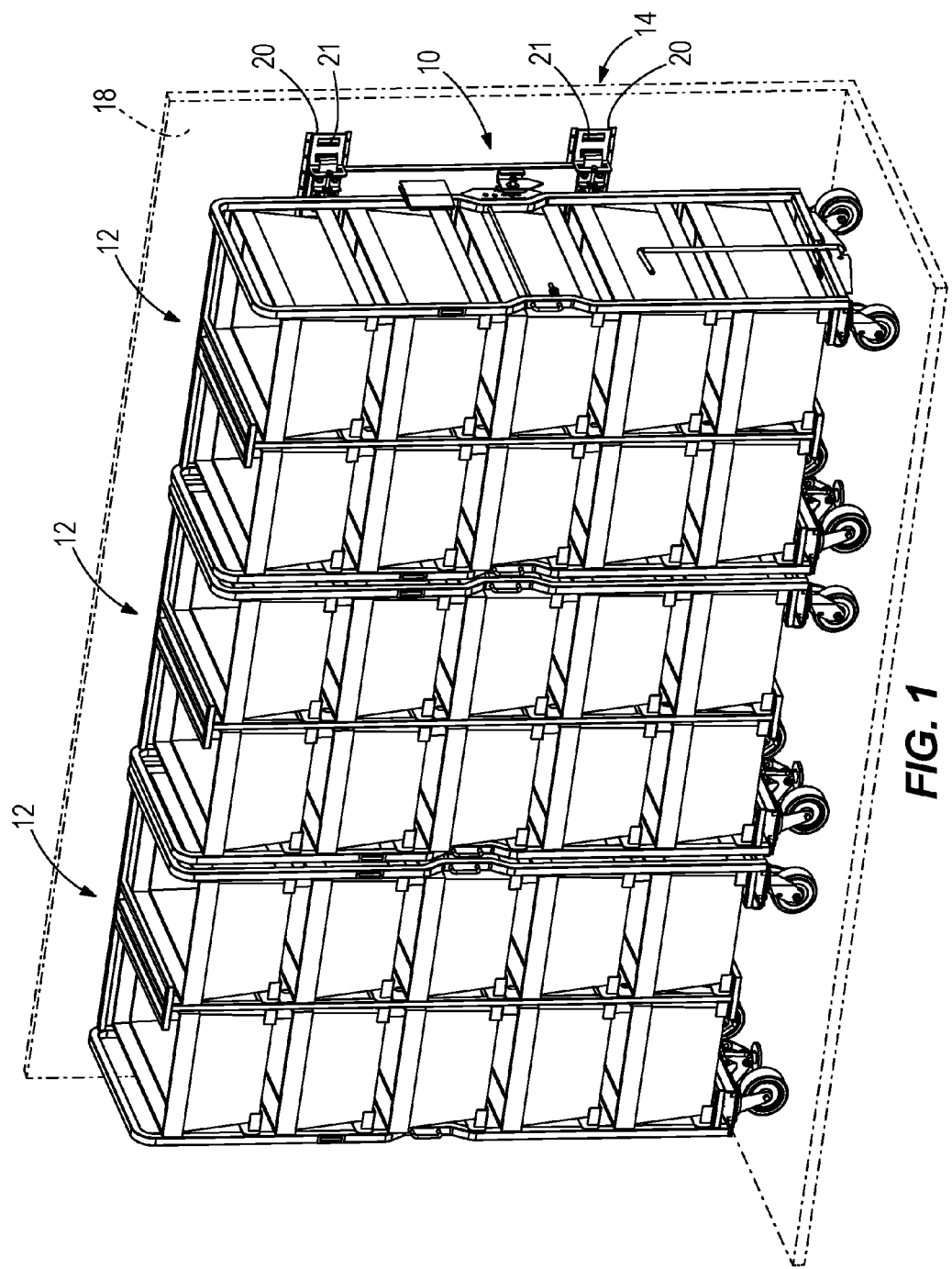
FIG. 1 is a front perspective view of a group of carts secured together in side by side relationship relative to a support structure by a first embodiment of a mounting and latching arrangement in accordance with the present disclosure.
Figure 6:
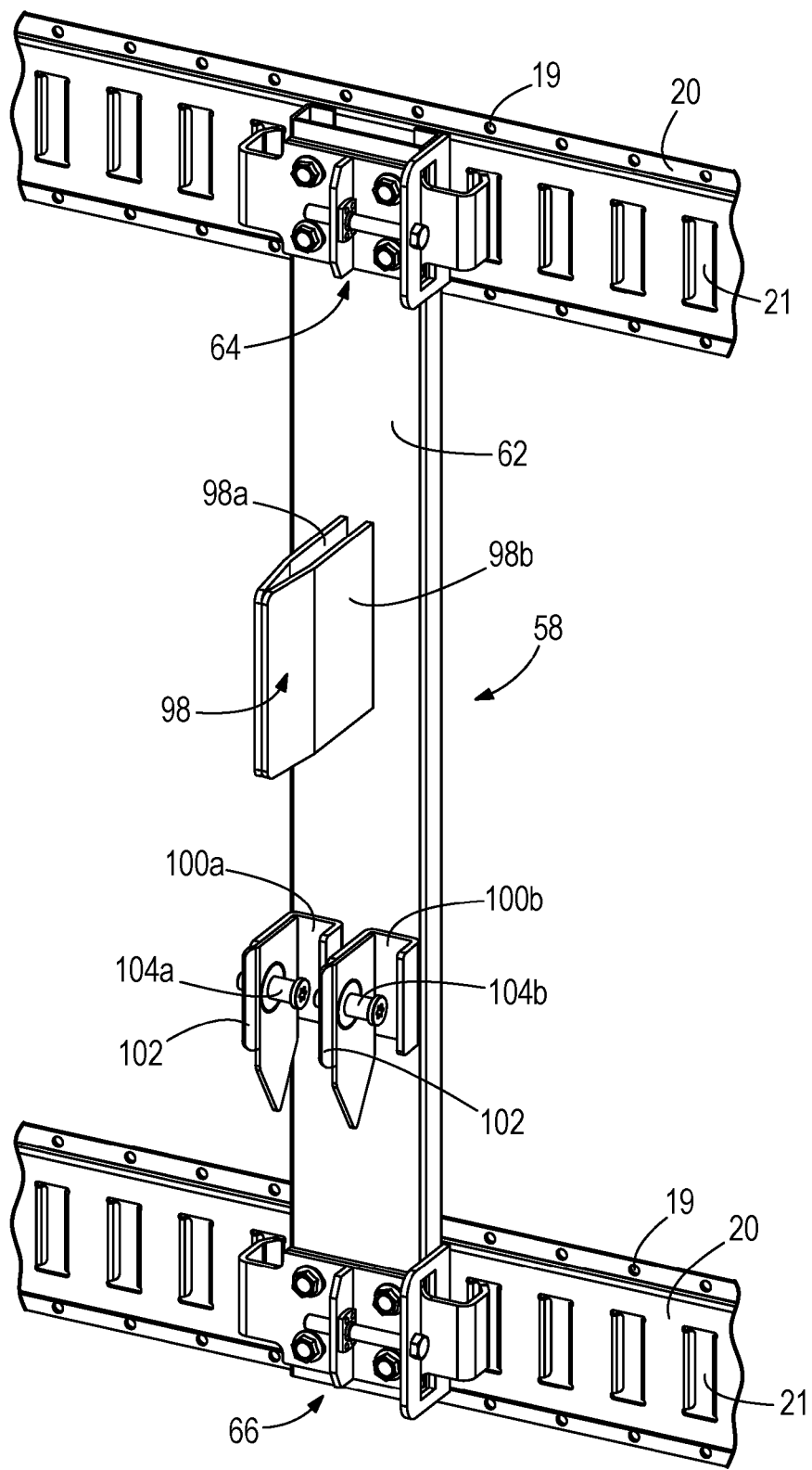
FIG. 6 is a fragmentary front perspective view of a mounting, guiding and receiving structure of the mounting and latching arrangement secured to the support structure as shown in FIG. 1.

In the example shown in FIG. 1, the support structure 14 is defined by a transit vehicle, such as a truck, having a horizontally extending cart support surface, such as a truck floor 16, and a vertically extending cart support surface, such as a truck wall 18, provided with attachment structure. The attachment structure in the examples shown is formed by a pair of commercially-available E-track connectors 20 which extend horizontally in parallel relationship along and are fixed to the truck wall 18 such as by passing fasteners through holes 19 (FIG. 6). As is well known, such E-track connectors are typically formed with a plurality of spaced apart slots 21 which are designed to receive and retain complimentary connector devices. It should be understood that the support structure is not limited to a truck, and may be formed by other suitable horizontally and vertically extending cart support surfaces, such as walls and floors of other static or moving structures. The truck wall 18 includes the E-track connector 20 or may otherwise take the form of a slotted wall.

Figure 4:
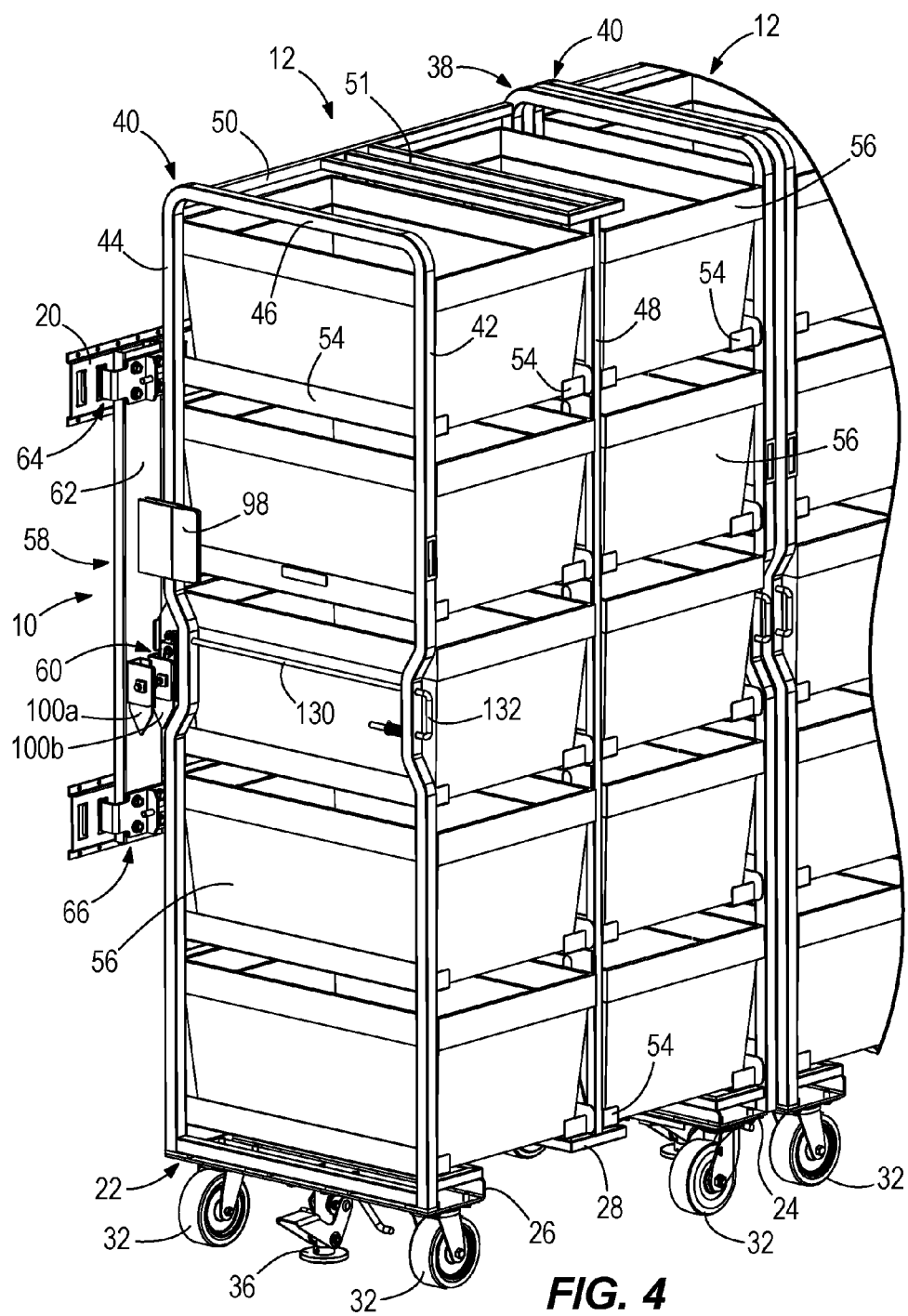
FIG. 4 is a fragmentary perspective view of the secured carts taken from the left side of FIG. 1.
Figure 5:
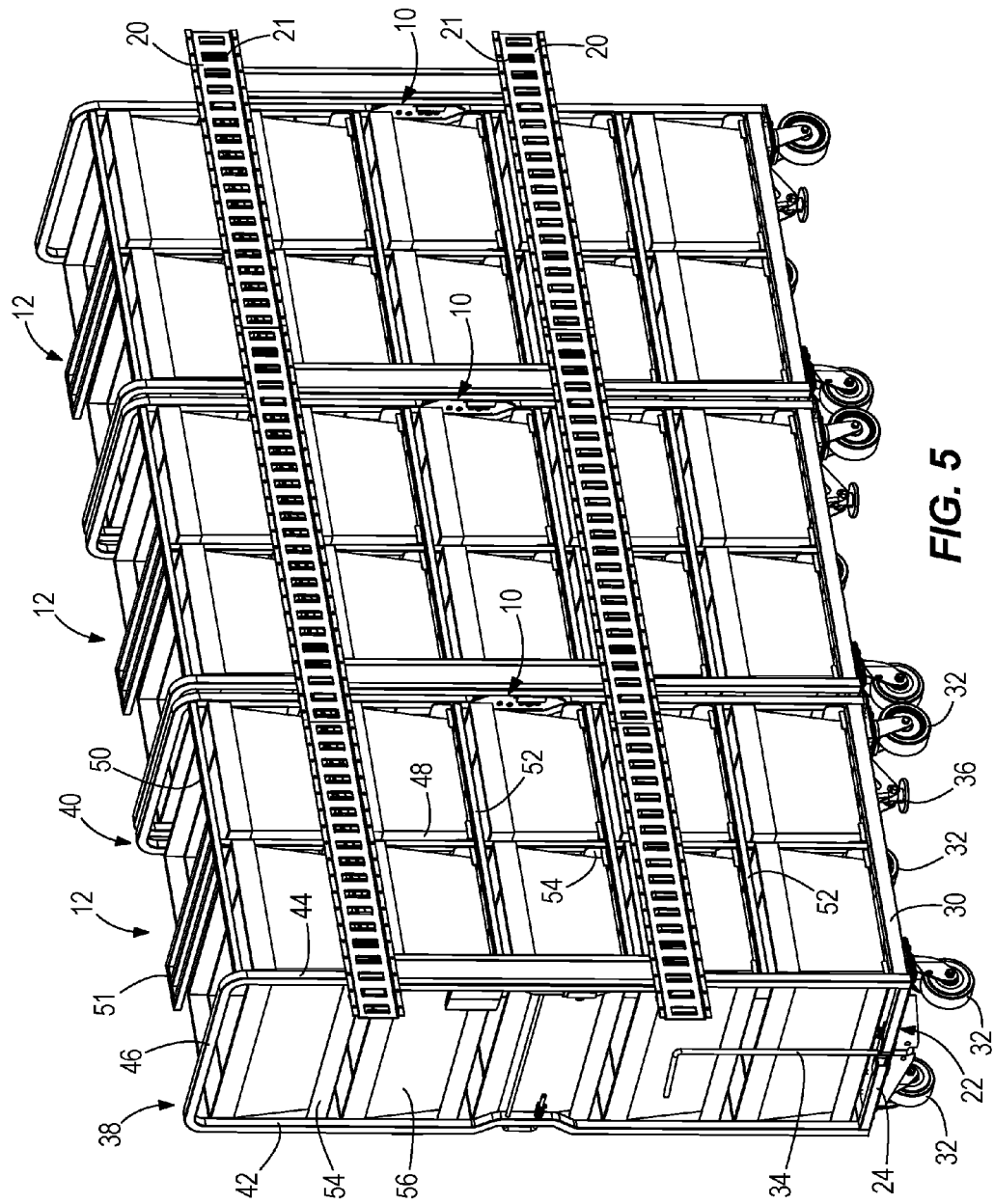
FIG. 5 is a rear view of the carts shown in FIG. 1 secured together by the mounting and latching arrangement.

As best seen in FIGS. 4, 5 and 15, each cart 12 is identically constructed of a base frame 22 having leading and trailing side portions 24, 26 and a center portion 28 extending forwardly from a rear cross member 30 (FIG. 5). A set of castor wheels 32 is provided on each of the side portions 24, 26 of the base frame 22. A pivoting handle 34 is provided on the leading side portion 24 to assist in pulling the cart 12. A braking mechanism 36 is included on the trailing side portion 26 for permitting and preventing rolling travel of the castor wheels 32 so as to selectively enable and disable transit of the cart 12. Opposed U-shaped side frames 38, 40 rise upwardly from the side portions 24, 26, respectively. Each of the side frames 38, 40 includes a front vertical member 42, a rear vertical member 44 and an upper cross member 46 connecting the front and rear vertical members 42, 44. A center member 48 rises upwardly from the center portion 28 of the base frame 22 and serves to divide the cart 12 into two equal sections. A horizontally extending upper rear cross member 50 interconnects the rear vertical members 44 of the side frames 38, 40 and a top 51 of the center member 48. A number of intermediate horizontally extending cross members 52 are secured to the rear vertical members 44 and the center member 48. A plurality of support brackets 54 are welded or otherwise affixed to the center portion 28, the side frames 38, 40 and the center member 48 for supporting a number of open top storage containers 56 on the cart 12. The storage containers 56 serve to hold a variety of items to be transported by the cart 12. Each cart 12 described above is designed such that the storage containers 56 may be inserted and removed from the support brackets 54 from an open front of the cart 12 as viewed in FIGS. 1, 4 and 5, for example.

In use, one or more of the carts 12 is loaded and then wheeled to a location where the carts 12 may be secured to a support structure. Typically, prior art carts have been wheeled into a truck or trailer for transport and secured to slotted E-track connectors on the truck wall by using E-track straps and other cart locking devices which securement has been found to be problematical. To improve upon the previous use of cart securement, the carts 12 are conveniently and more efficiently locked and unlocked relative to the slotted E-track connectors 20 secured on the truck wall 18 as shown in FIG. 1 by the mounting and latching arrangement 10 of the present disclosure.

Figure 3:
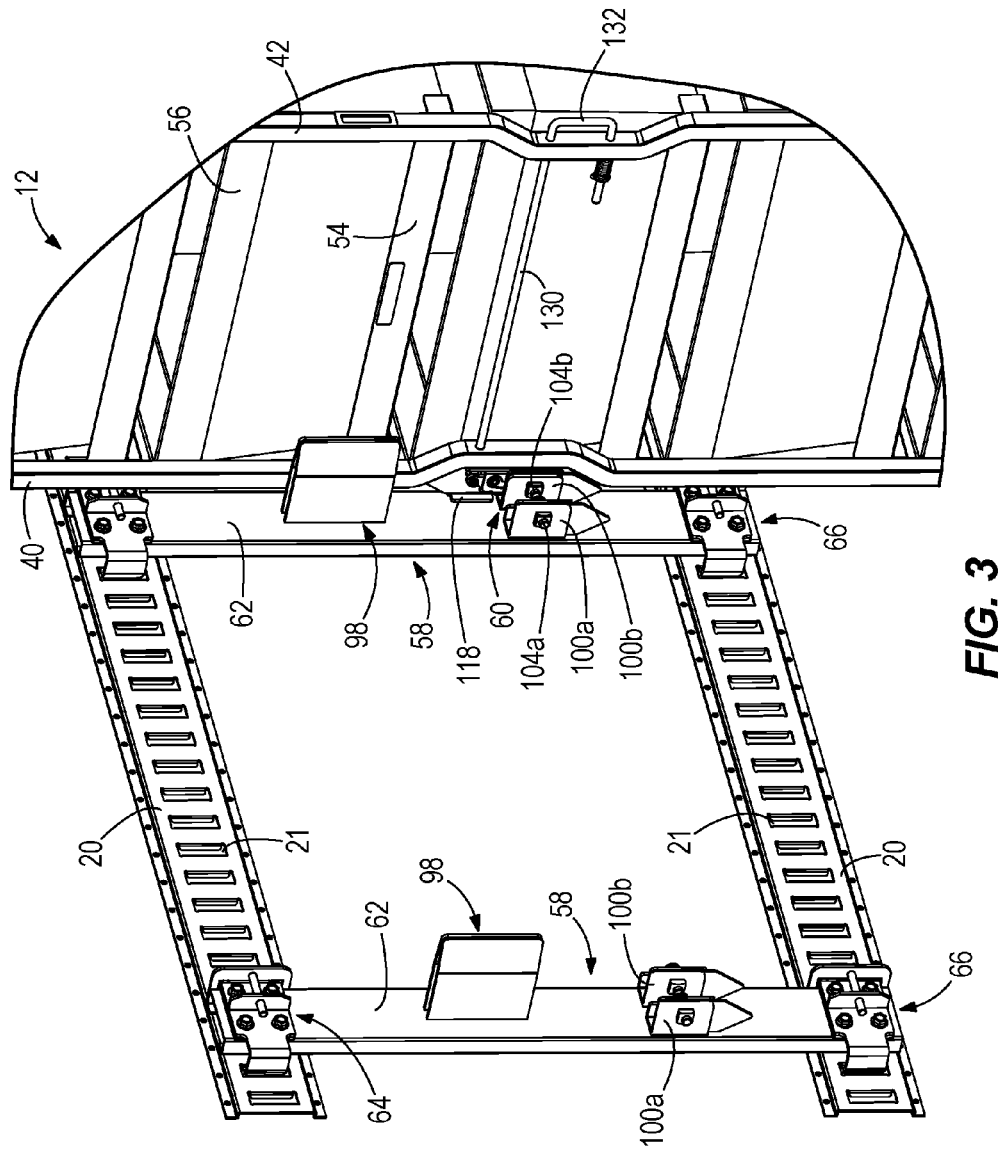
FIG. 3 is a fragmentary perspective view of the secured carts in FIG. 1 with the cart on the far left removed from the mounting and latching arrangement.

Referring to FIG. 3, the mounting and latching arrangement 10 is comprised of mounting, guiding and receiving structure 58 attached to the E-track connectors 20 and cooperating aligned latching and actuation structure 60 secured on the opposed side frames 38, 40 of each cart 12. The latching and actuation structure 60 provided on each cart 12 is selectively engageable and disengageable with portions of the mounting, guiding and receiving structure 58.

As illustrated in FIGS. 6-12, each mounting, guiding and receiving structure 58 includes an elongated vertical mounting channel 62 having opposed ends provided with an upper mounting bracket assembly 64 and a lower mounting bracket assembly 66 which are identical in construction. The upper and lower mounting bracket assemblies 64, 66 are designed to connect the vertical mounting channels 62 at desired locations to and between the E-track connectors 20. As best understood from FIG. 7, each of the upper and lower mounting bracket assemblies 64, 66 commonly includes a side plate 68, a fixed bracket 70, a movable bracket 72, a tension bolt 74 and a set of retainer bolts 76 provided at upper and lower ends of the vertical mounting channel 62. Each side plate 68 is fixed, such as by welding, to a side edge of the vertical mounting channel 62, and is formed with a slot 78 and an aperture 80. Each fixed bracket 70 has a face plate 82 fixed, such as by welding, to a front surface of the vertical mounting channel 62. Each face plate 82 is integrally constructed with a projection in the form of a first flange 84 which extends through the slot 78 and is bent rearwardly thereof. Each face plate 82 is further formed with a set of threaded openings 86 which are aligned with a set of like threaded openings (not shown) formed through the front surface of the vertical mounting channel 62. Each movable bracket 72 is defined by a movable plate 88 integrally constructed with a projection in the form of a second flange 90 which is also bent rearwardly. Each movable plate 88 is formed with a group of slots 92 which are configured to be aligned with the threaded openings 86 in the face plate 82. In addition, each movable plate 88 has a forwardly extending fin 94 with a retainer member 96 joined thereto. The fin 94 and the retainer member 96 are formed therethrough with a threaded passage. As will be more fully described below, each tension bolt 74 is designed to be passed through the aperture 80 and be threadably received and retained in the threaded passage formed in the fin 94 and the retainer member 96 so as to secure the first flange 84 and the second flange 90 against flanged wall structure of the selected slots 21 of the E-track connectors 20. The retainer bolts 76 are configured to be passed through the slots 92 of movable plate 88 and then threaded into the threaded openings 86 in the face plate 82 and the aligned threaded openings in the vertical mounting channels 62 to further secure the fixed bracket 70 and the movable bracket 72 together.

Figure 7:
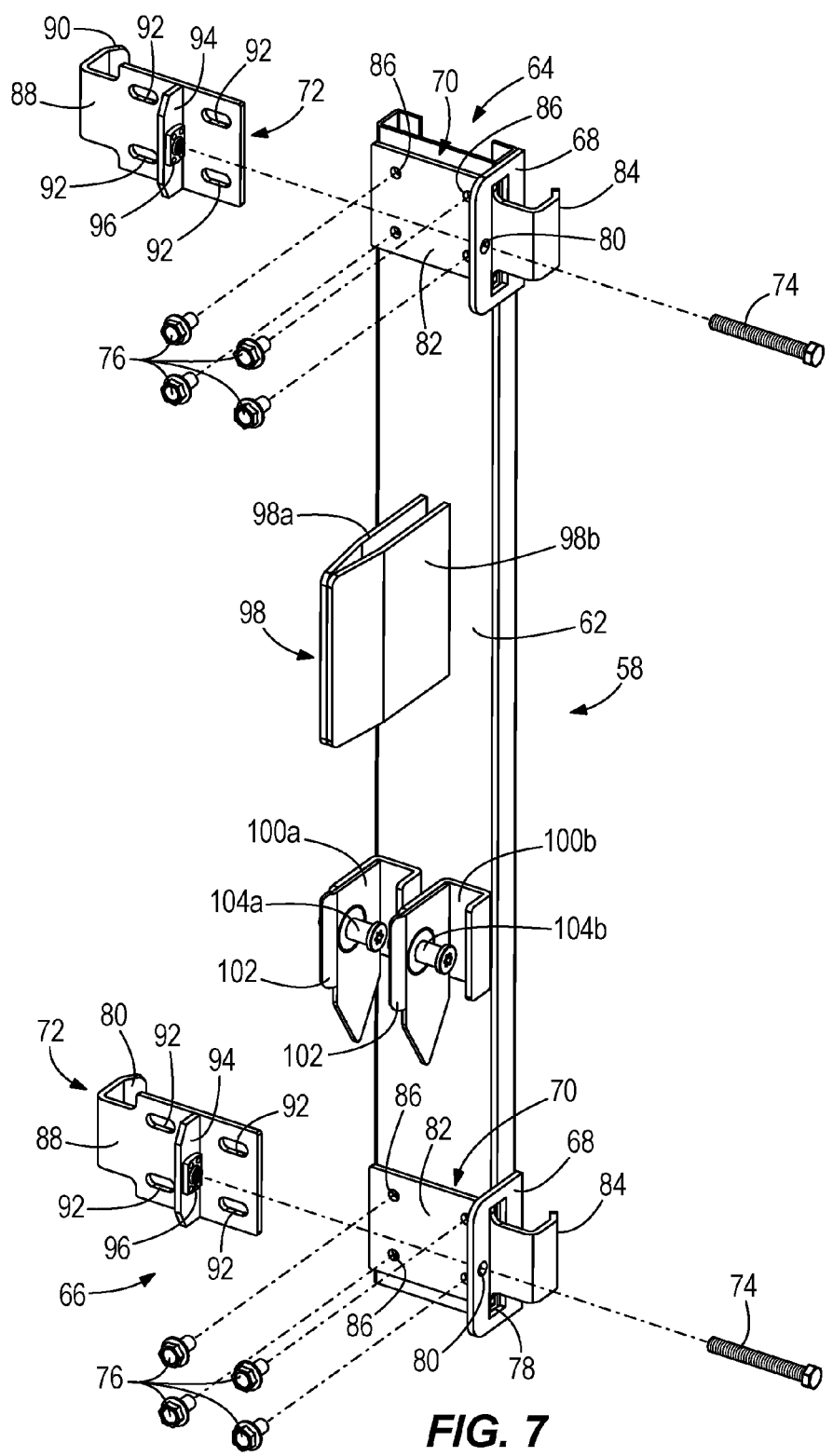
FIG. 7 is an exploded view of the mounting, guiding and receiving structure shown in FIG. 6.

As further seen in FIG. 7, a fixed lead-in guide element 98 projects forwardly from the front face of the vertical mounting channel 62. The lead-in guide bracket 98 has opposed converging side surfaces 98a, 98b (FIG. 10) and is designed to guide side frames 38, 40 of carts 12 which are to be secured to the E-track connectors 20. A slam latch bracket configuration is defined by a pair of slam latch brackets 100a, 100b which are rigidly attached to and extend forwardly in side by side relationship from the front surface of the vertical mounting channel 62. Each of the slam latch brackets 100a, 100b include a bent guide plate 102, and a striker bolt 104a, 104b forming a striker structure which extends transversely through a side wall of the slam latch bracket 100a, 100b and the bent guide plate 102 and is threaded into a nut 106 (FIGS. 8 and 10). As will be appreciated hereafter, the striker bolts 104a, 104b are configured to latchingly engage with latch assemblies on the side frame 38 of the cart 12, and the side frame 40 of an adjacently disposed cart 12. The bent guide plates 102 are used to facilitate guiding of the latch assemblies on the carts 12.

Figure 17:
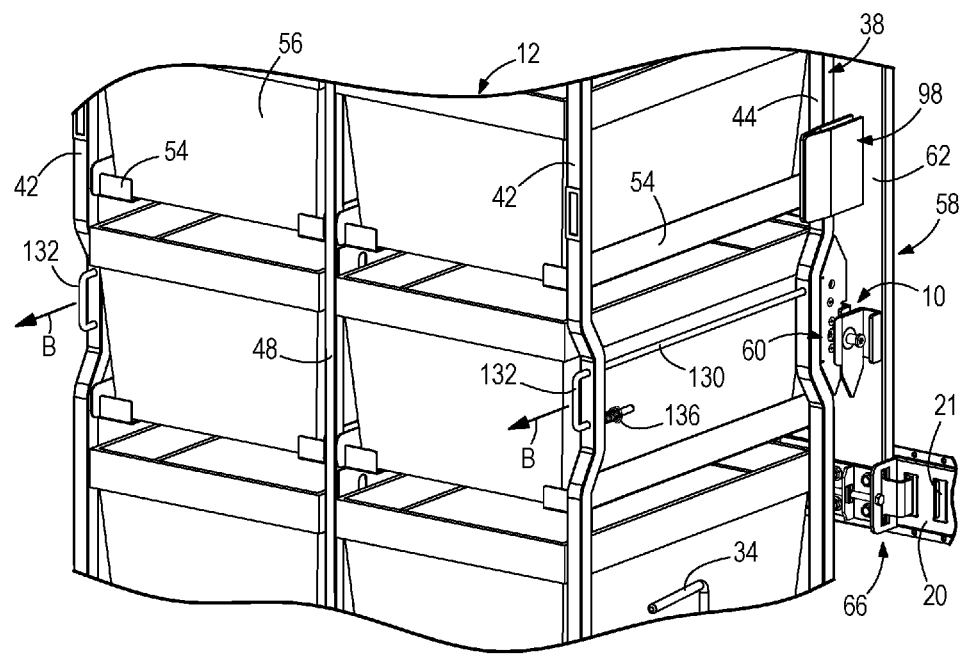
FIG. 17 is a front perspective view illustrating the locking of one side of the cart using the mounting and latching arrangement.
Figure 18:
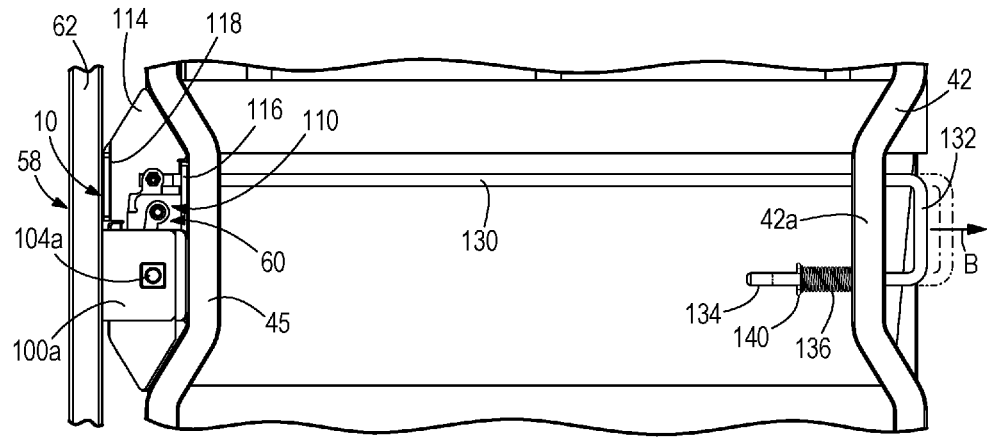
FIG. 18 is a side view illustrating the locking of the cart using the mounting and latching arrangement.
Figure 21:
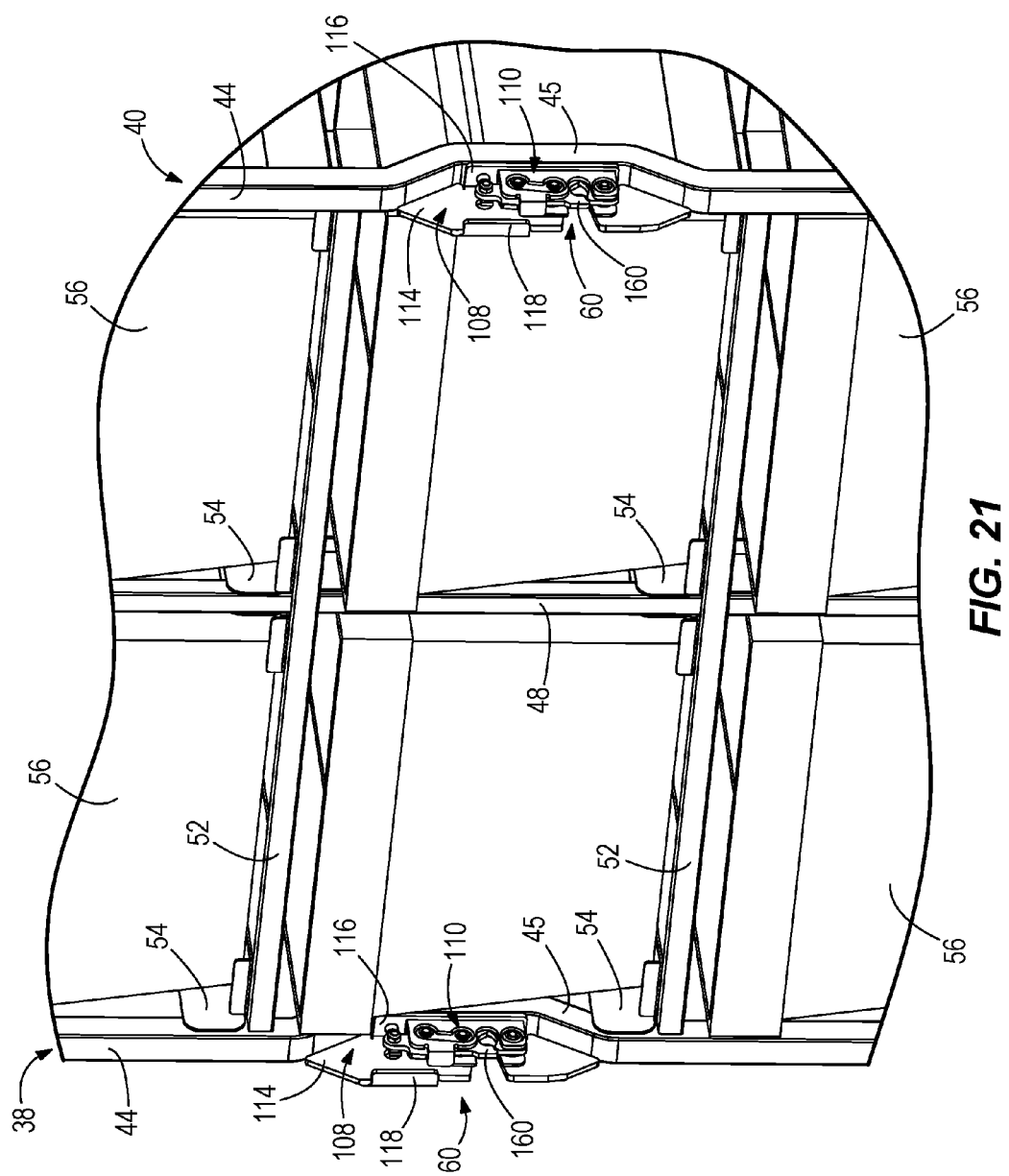
FIG. 21 is a fragmentary rear view of the cart showing latch brackets and latch assemblies of the mounting and latching arrangement.

Turning now to FIGS. 15-26, each latching and actuation structure 60 includes a latch bracket 108 for retaining a rotary latch assembly 110 which is operatively connected with a release arrangement 112 provided on each of the side frames 38, 40 of each cart 12. As seen in FIGS. 19 and 20, each latch bracket 108 is defined by a latch plate 114 integrally formed with a bent rear plate 116 and a bent front plate 118. The bent rear plate 116 is fixed, such as by welding, to a bent portion 45 of the rear vertical member 44 of each side frame 38, 40 as seen in FIGS. 18 and 21. The bent front plate 118 is configured to engage the front surface of the vertical mounting channel 62 as seen in FIGS. 3 and 18 when the mounting, guiding and receiving structure 58 is coupled to the latching and actuation structure 60.

With further reference to FIGS. 19 and 20, each latch plate 114 has an upper opening 120, a set of apertures 122 and a receiving slot 124 designed to receive the striker bolt. 104a, 104b on the slam latch bracket 100a, 100b. Threaded fasteners 126a, 126b, 126c are passed through the apertures 122 and threaded into aligned threaded holes 128 provided in the rotary latch assembly 110 to secure the rotary latch assembly 110 to the latch bracket 108.

Each release arrangement 112 is integrally formed with an elongated rod portion 130, a bent release handle portion 132 and an elongated mounting portion 134. The mounting portion 134 is designed to receive a spring 136, a washer 138 and a retainer 140 thereon. As best seen in FIG. 20, a flattened end 142 of the elongated rod portion 130 having an aperture 144 is passed through an opening 146 formed in the bent rear portion 118. The flattened end 142 is then pivotally attached to a release lever 148 of the rotary latch assembly 110 by a screw 150 which passes through the aperture 144 and an aperture 152 in the release lever 148, and is secured by a nut 154. Upper opening 120 in the latch plate 114 provides access to the screw 150.

Referring to FIGS. 15-18, each elongated rod portion 130 extends forwardly through the bent portion 45 of the rear vertical member 44 and a bent portion 42a of the front vertical member 42 of each of the side frames 38, 40. Each release handle 132 projects forwardly from the bent portion 42a and is held in the solid line position shown in FIG. 18 with the assistance of the spring 136 held by the retainer 140 on the mounting portion 134 and engaged against the bent portion 42a.

Figure 24:
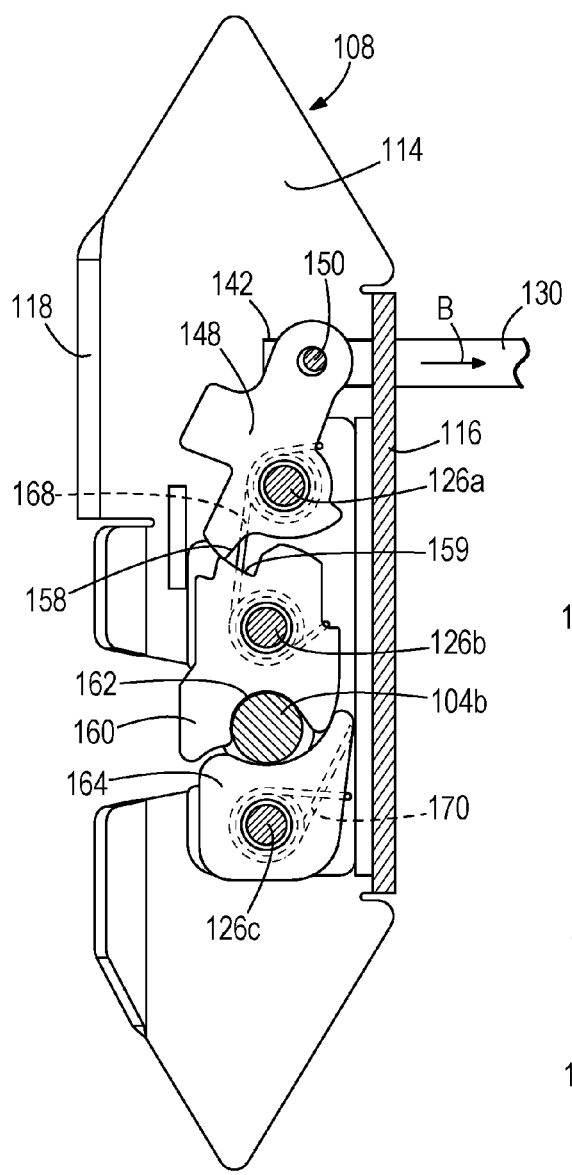
FIGS. 24 and 25 are sectional views similar to FIG. 23 showing the progressive unlocking of the latch bracket and the latch assembly.
Figure 25:
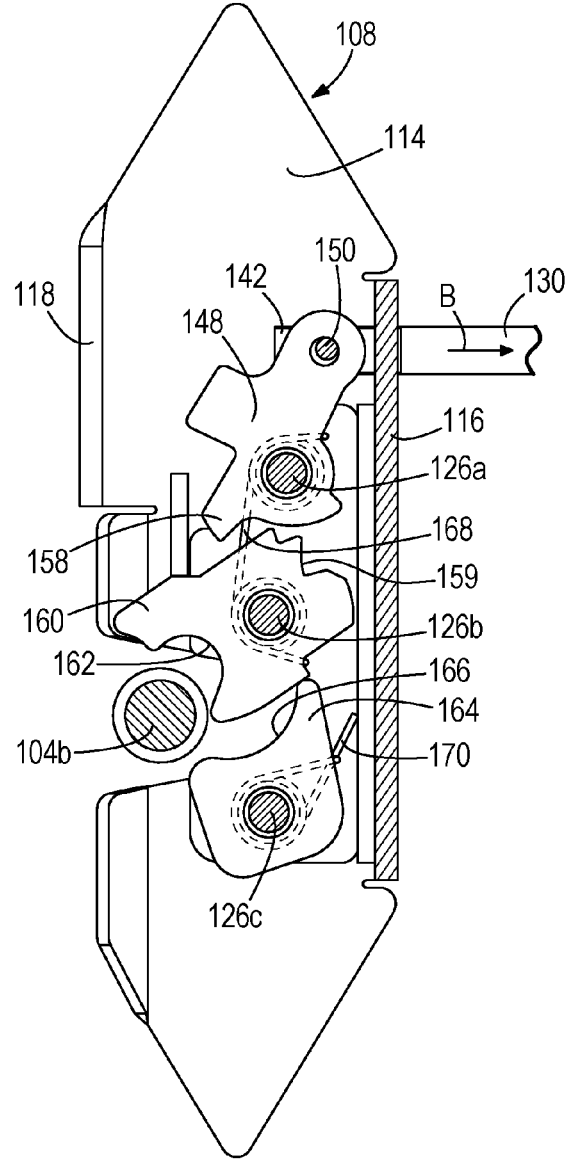
Figure 26:
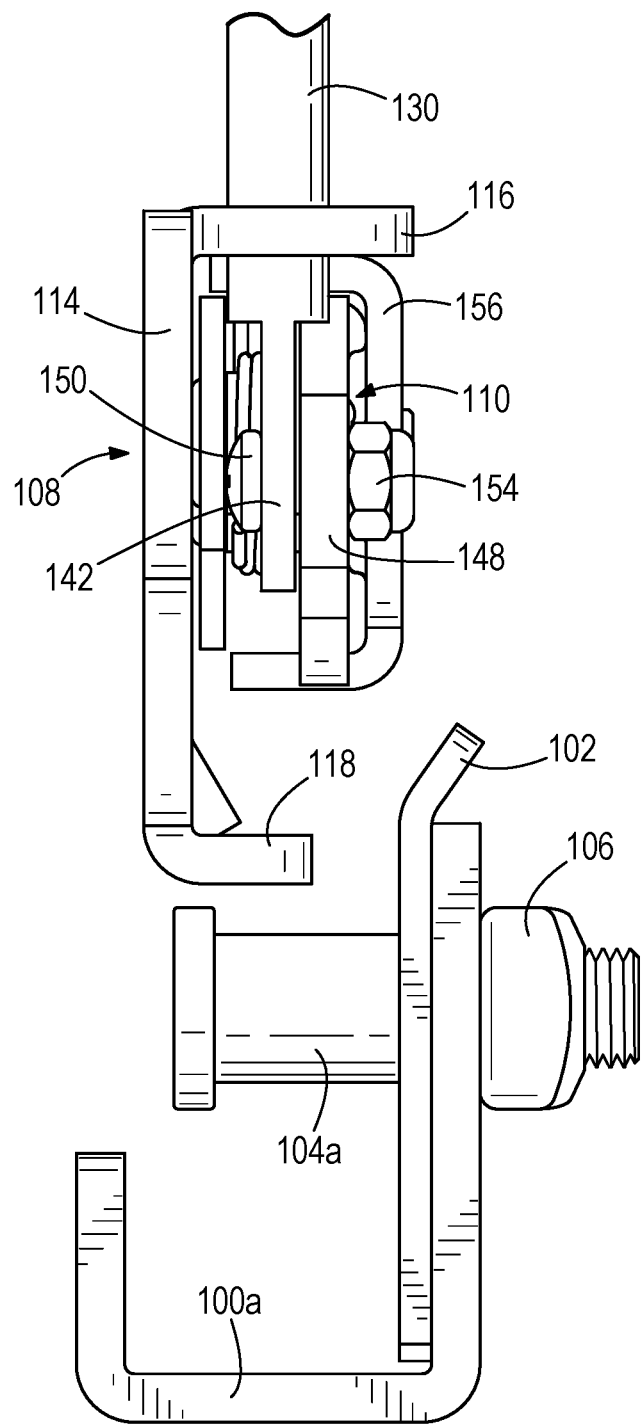
FIG. 26 is the top view of the latch bracket and the latch assembly in an unlocked position.

Turning to FIGS. 22-26, each rotary latch assembly 110 has a housing 156 for pivotally mounting the release lever 148 having a pawl 158 rotatably mounted about the threaded fastener 126a. The pawl 158 is engageable and disengageable with a notch 159 formed in a first rotary jaw 160 which is pivotally mounted about the threaded fastener 126b and which has a first curved engagement surface 162 (FIG. 25). A second rotary jaw 164 is pivotally mounted about the threaded fastener 126c, and has a second curved engagement surface 166. A first torsion spring 168 is provided between the release lever 148 and the first rotary jaw 160. A second torsion spring 170 is provided for the second rotary jaw 164. As depicted in FIG. 24, the first and second curved engagement surfaces 162 and 166 cooperate to capture and lock striker bolts 104a, 104b when it is desired to lock the cart 12 to the truck wall 18. Each rotary latch assembly 110 is designed such that the release lever 148, the first rotary jaw 160 and the second rotary jaw 164 are biased to the position shown at FIG. 25. When the first rotary jaw 160 comes into engagement with a striker element, such as striker bolt 104b, the first and second rotary jaws 160, 164 pivot into a locked position shown at FIG. 23 in which pawl 158 is captured in notch 159 of the first rotary jaw 160. Release of the rotary latching assembly 110 is controlled by manual movement, of the release arrangement 112 as will be described in further detail below.

Figure 2:
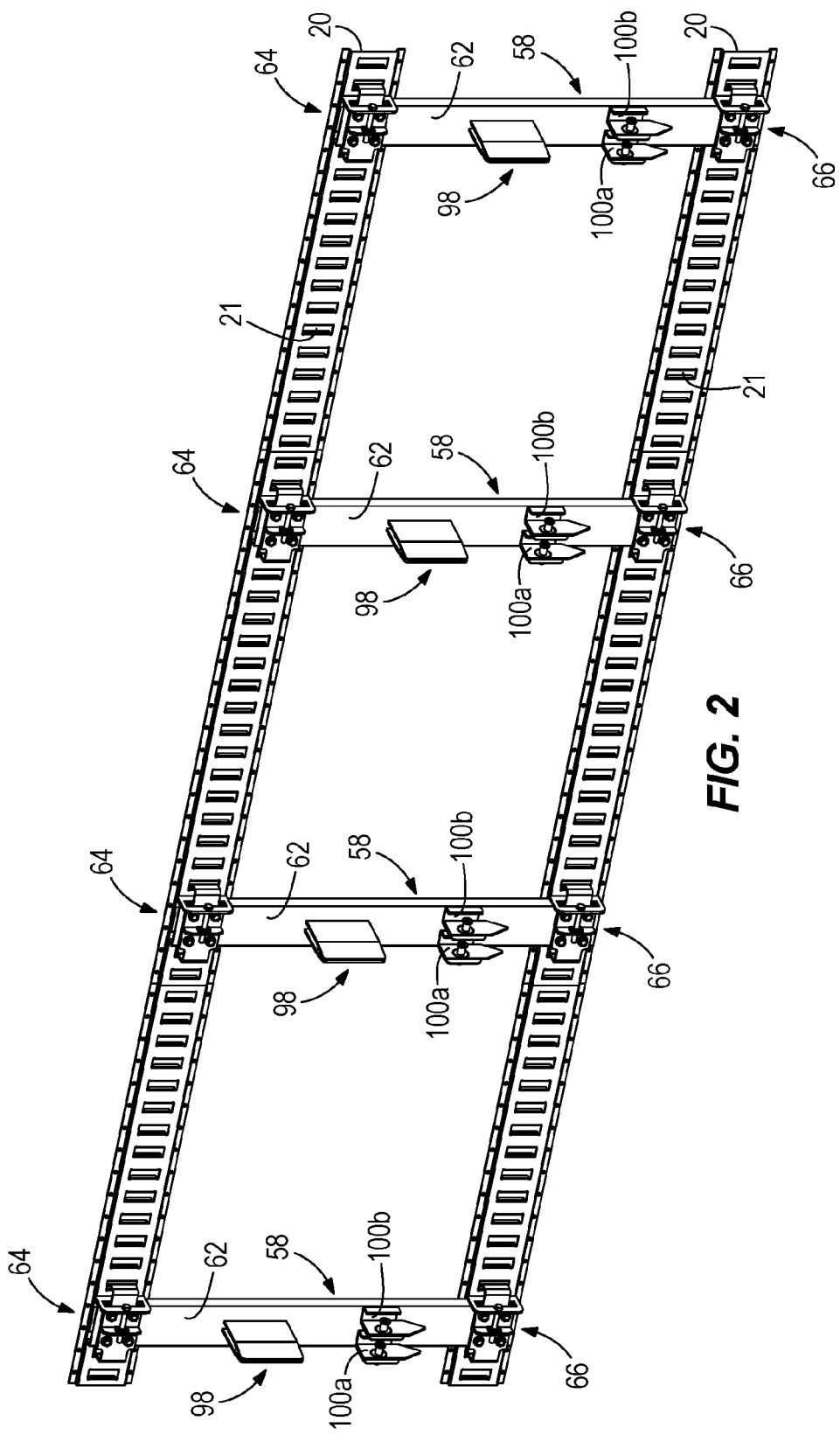
FIG. 2 is an isolated front perspective view of the mounting and latching arrangement as coupled to the support structure shown in FIG. 1.
Figure 14:
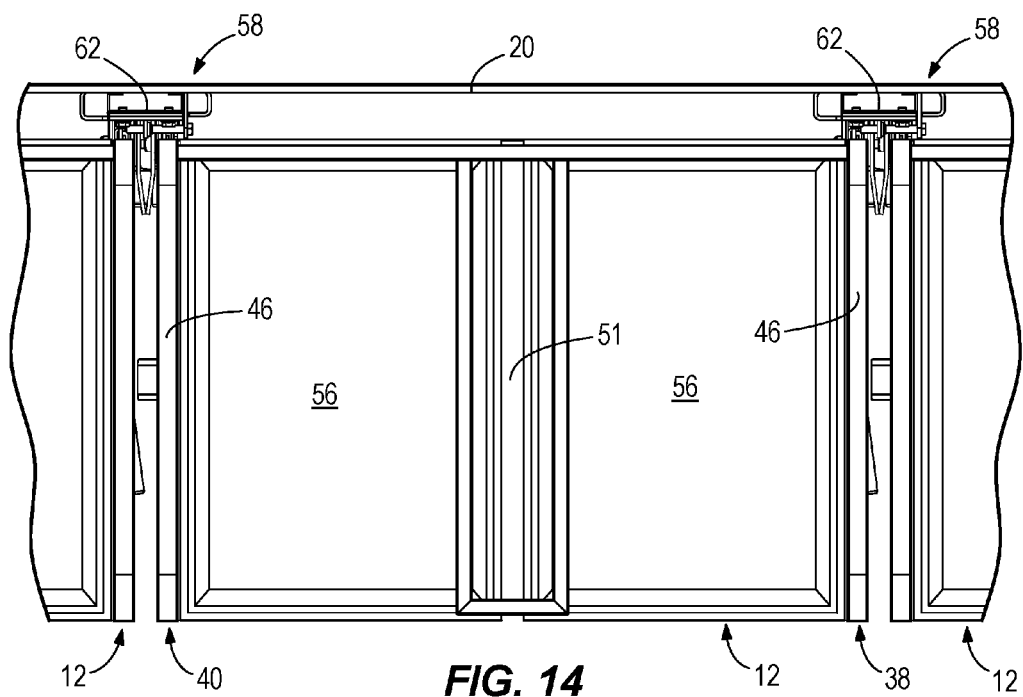
FIG. 14 is a top view of the center cart of FIG. 1 shown coupled to the support structure of the mounting and latching arrangement.

In use of the mounting and latching arrangement 10 for securing the cart 12, the mounting, guiding and receiving structure 58 is first installed in spaced apart relationship on the E-track connectors 20 joined to the truck wall 18 at positions which will enable cooperation with the latching and actuation structure 60 on the cart 12. For example, as shown in FIGS. 2, 3, and 14, at least, one pair of vertical mounting channels 62, each provided with the lead-in guide element 98 and the slam latch brackets 100a, 100b, are mounted between the E-track connectors 20 using the upper and lower mounting bracket assemblies 64, 66.

Figure 11:
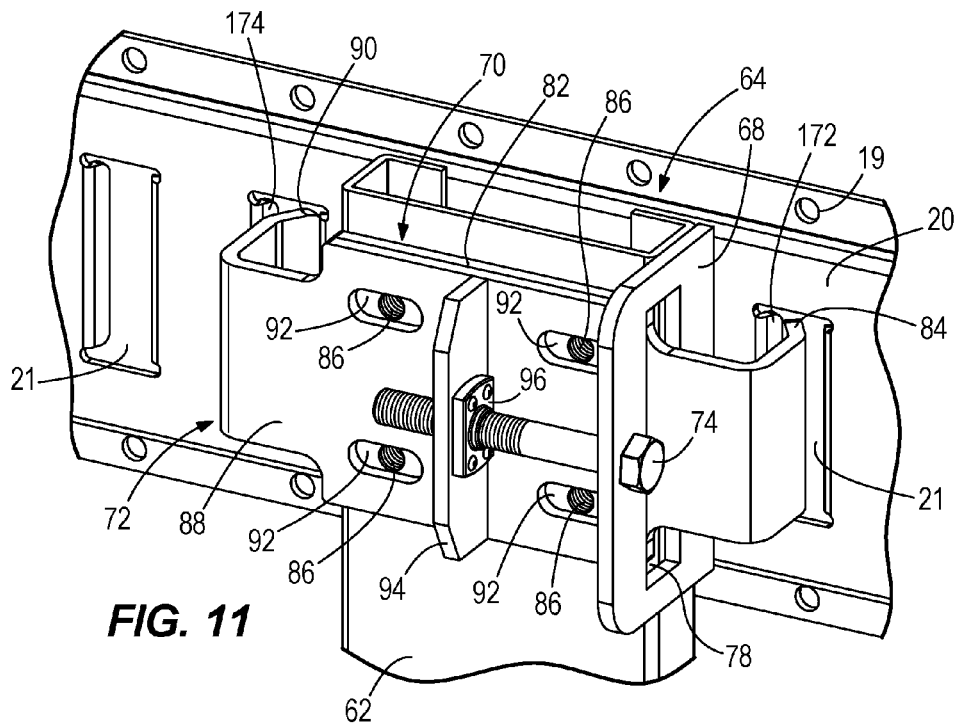
FIG. 11 is a fragmentary, enlarged perspective view of a partial mounting of an upper portion of the mounting, guiding and receiving structure being mounted to the support structure.
Figure 12:
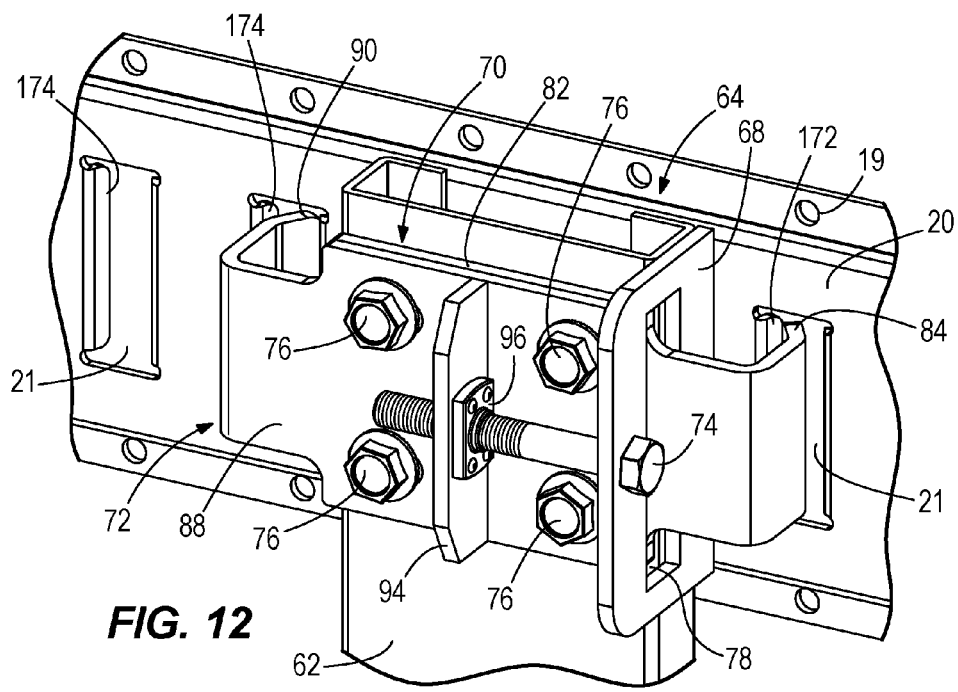
FIG. 12 is a view similar to FIG. 11 illustrating a completed mounting of the upper portion of the mounting, guiding and receiving structure of FIG. 6 to the support structure.
Figure 13:
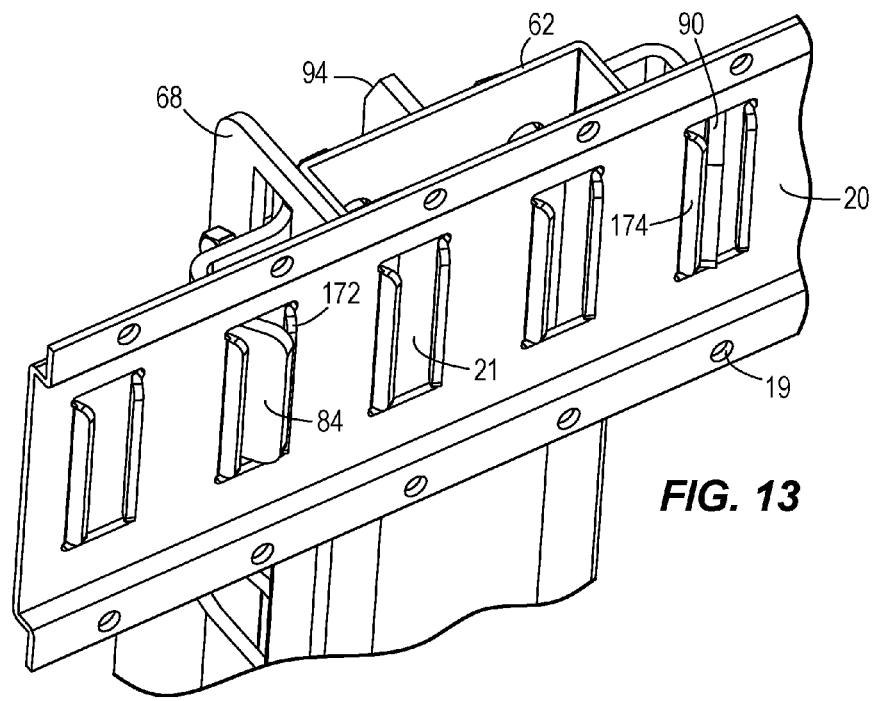
FIG. 13 is a fragmentary rear perspective view of the mounting, guiding and receiving structure of FIG. 12 shown mounted to the support structure.

Referring to FIGS. 11-13, for each of the upper and lower mounting bracket assemblies 64, 66, each first flange 84 on face plate 82 is inserted through and initially engaged against a flanged wall 172 of a desired slot 21. Movable plate 88 is positioned upon the face plate 82 so that the second flange 90 is inserted through and initially engaged against a flanged wall 174 of a further desired slot 21. Tension bolt 74 is tightened to draw the movable plate 88 across a face plate 82 until the first and second flanges 84, 90 are positively gripped against the flanged walls 172, 174. Thereafter, the retainer bolts 76 are used to secure the movable plate 88 relative to the face plate 82.

Once the vertical mounting channels 62 have been installed in spaced apart relationship on the E-track connectors 20, the cart 12 is positioned such that the rear vertical members 44 of the opposed side frames 38, 40 face the E-track connectors 20, and are in alignment with the vertical mounting channels 62. The cart 12 is then pushed towards the E-track connectors 20 and the vertical mounting channels 62 as represented by the arrows A in FIG. 15. As the cart 12 approaches the truck wall 18, the side surface of each rear vertical member 44 is guided, such as shown, for example, by the side surface 98a of the lead-in guide element 98 in FIG. 16 which guides the rear vertical member 44 on the side frame 38. In addition, the housings 156 of the rotary latch assemblies 110 are guided by the bent guide plates 102 (see FIG. 26) as the rotary latch assemblies 110 are slammed into locking engagement with the striker bolts 104a, 104b. FIGS. 22 and 23 show representative locking engagement of the striker bolt. 104b in the rotary latching assembly 110 on the left side of the cart 12 shown in FIG. 3. One or more other carts 12 can be separately locked on either or both sides of the secured cart 12 using corresponding mounting, guiding and receiving structure 58 and latching and actuation structure 60 as described above.

When it is desired to unlock the cart 12 from a pair of vertical mounting channels 62, the release handles 132 projecting from the front vertical members 42 on the opposed side frames 38, 40 are pulled forwardly as shown by the arrows B in FIGS. 17 and 18 compressing the springs 136. Pulling on the release handles 132 causes the elongated rod portion 130 to be moved forwardly simultaneously in the direction of arrows B in FIGS. 24 and 25. In turn, the release levers 148 are pivoted such that the pawls 158 are disengaged from the notches 159 of the rotary jaws 160 enabling release of the striker bolts 104a, 104b after which the release handles 132 are let go. At this point, the cart 12 is freed for mobile transfer as desired, such as for rolling movement out of the truck.

Figures 27, 28:
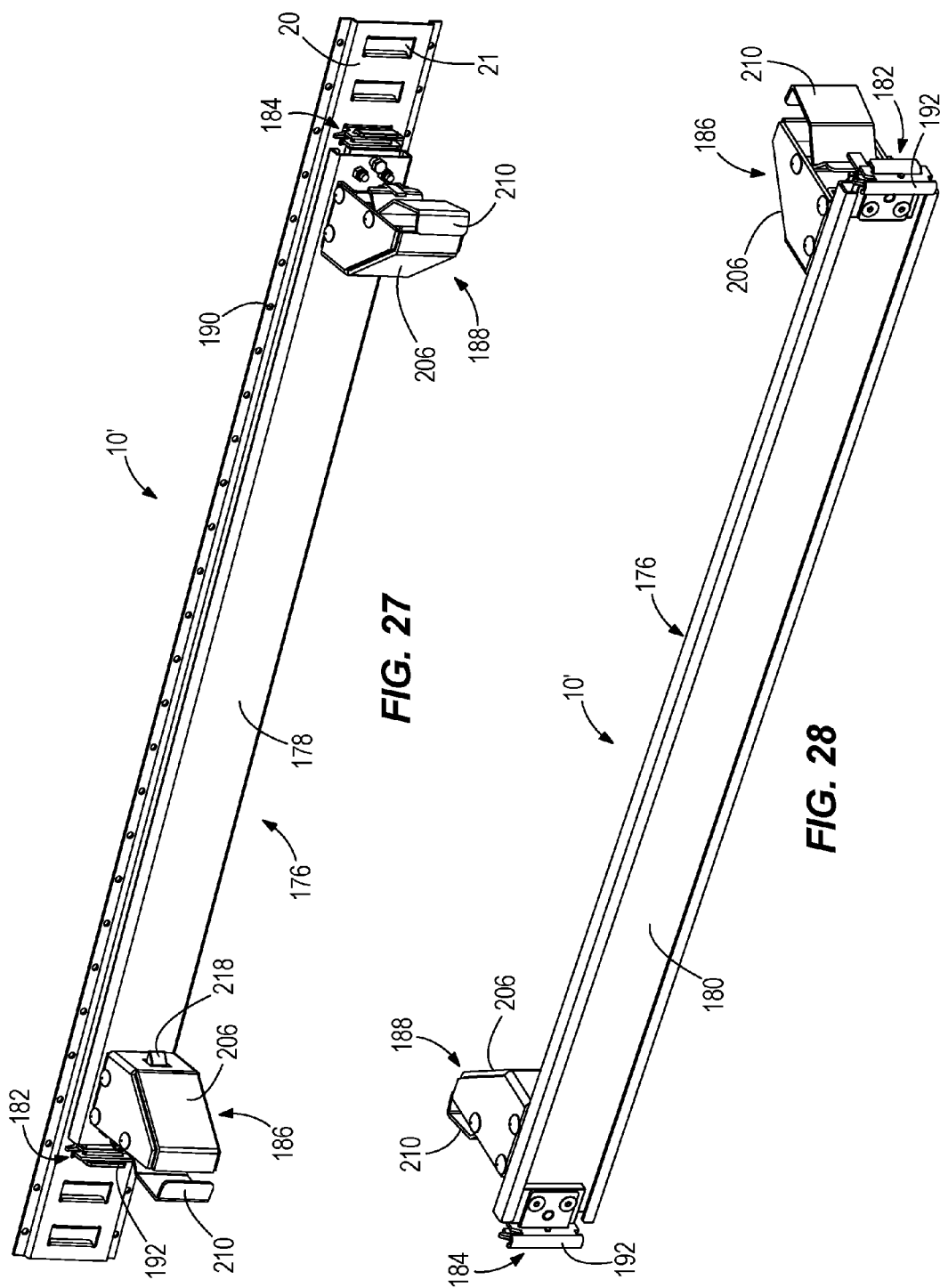
FIG. 27 is a front perspective view of a second embodiment of the mounting and latching arrangement.
FIG. 28 is a rear perspective view of the mounting and latching arrangement of FIG. 27.
Figure 35:
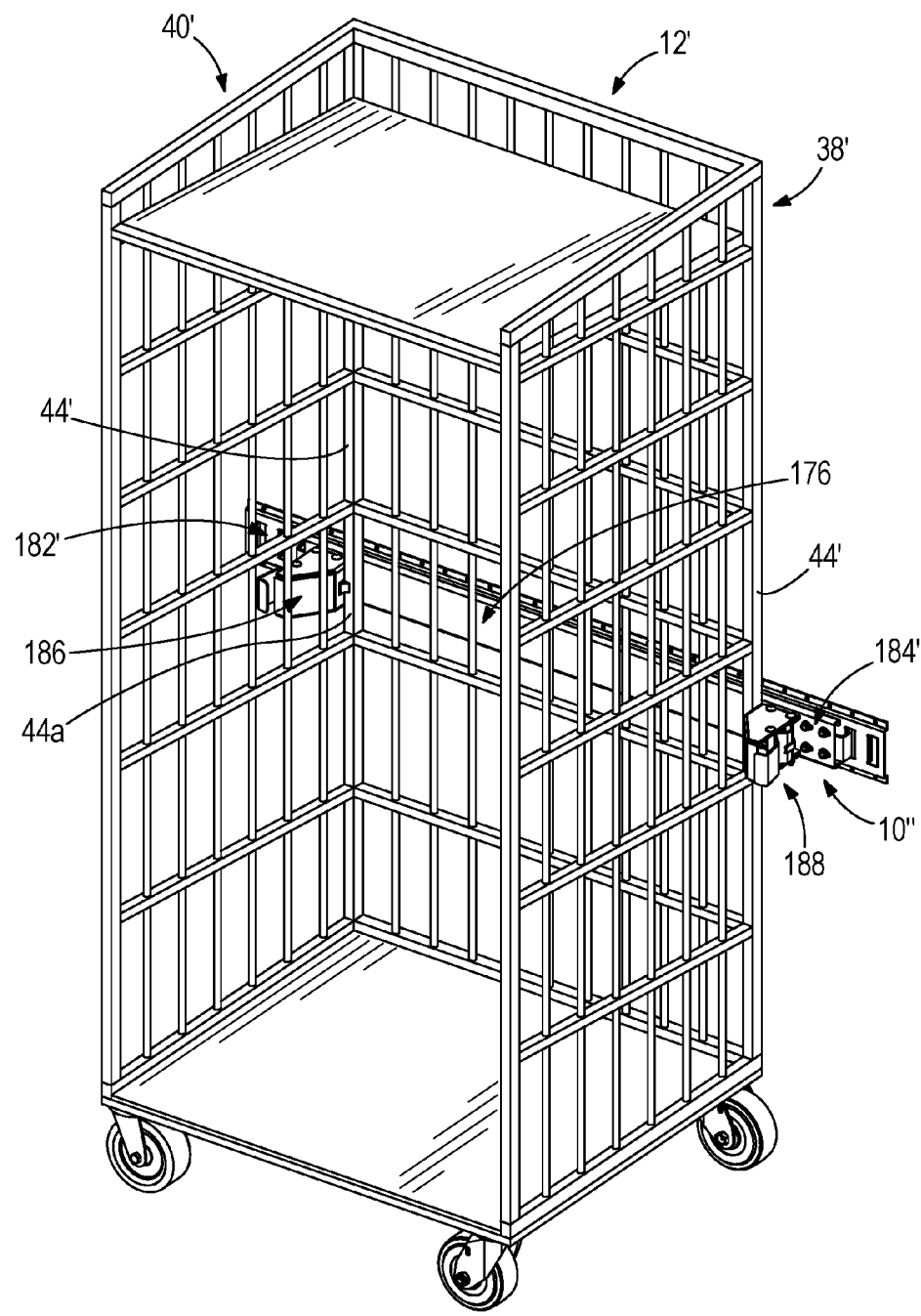
FIG. 35 is a front perspective view of a cart locked to a support structure by the mounting and latching arrangement of FIG. 33.

The present disclosure also contemplates a second exemplary embodiment of a mounting and latching arrangement 10' as shown at FIGS. 27-32 which includes an elongated horizontal mounting channel 176. The horizontal mounting channel has a front face 178 and a rear face 180, and as best seen in FIG. 28 is formed with a C-shape when viewed in vertical cross section. The horizontal mounting channel 176 also has opposed right and left ends which are provided with identical mounting bracket assemblies 182, 184 designed to be coupled to flanged structure provided on spaced apart slots 21 of a horizontally extending E-track connector 20 to be fixed on a support surface. The opposed ends of the horizontal channel 176 further include a pair of identical latch housing assemblies 186, 188 configured for locking and unlocking members on opposed sides of a cart, such as the rear vertical members 44' on opposed side frames 38' 40' of a cart 12' as shown at FIG. 35.

Figure 31:
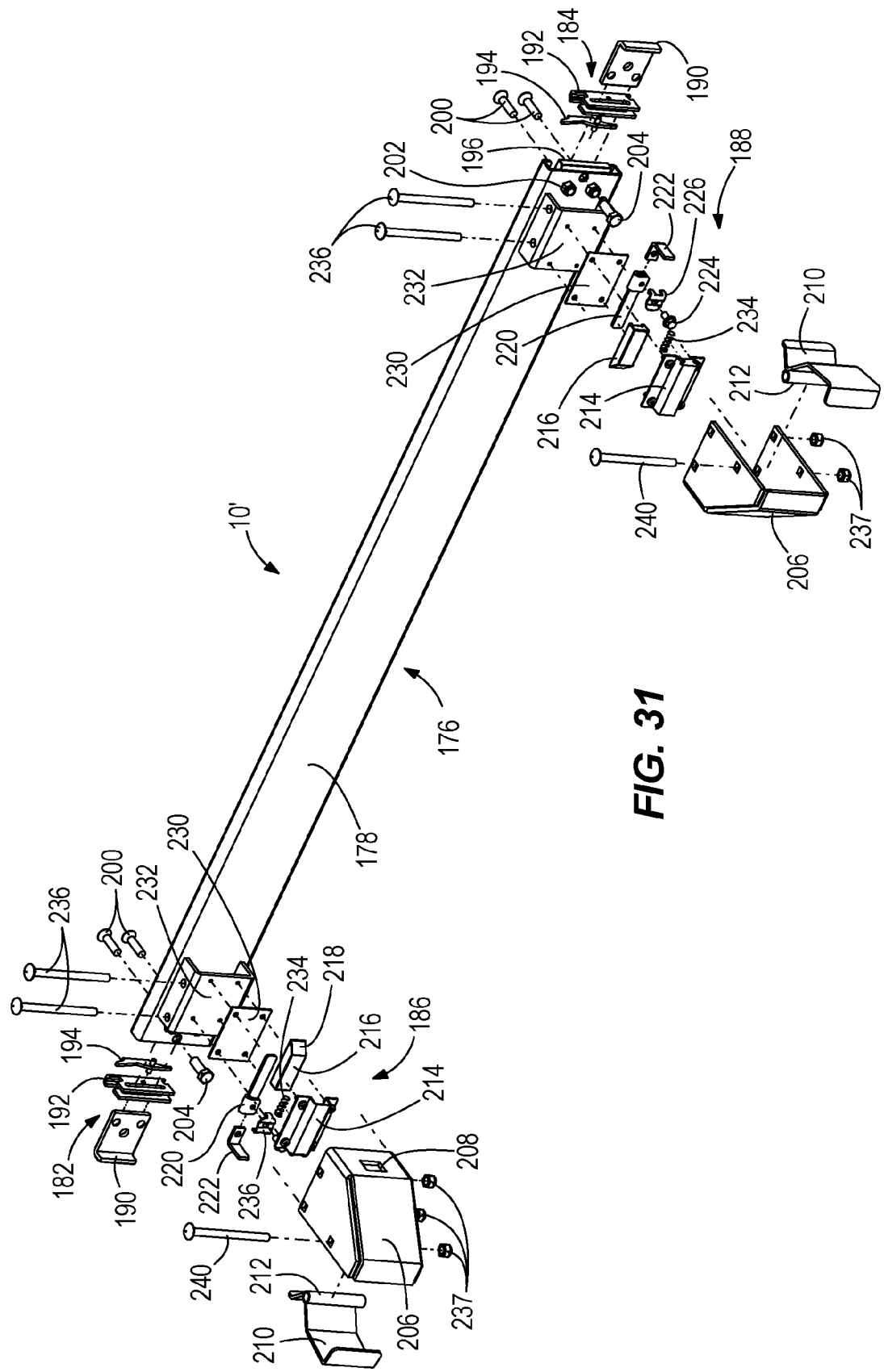
FIG. 31 is an exploded view of the mounting and latching arrangement of FIG. 27.
Figure 32:
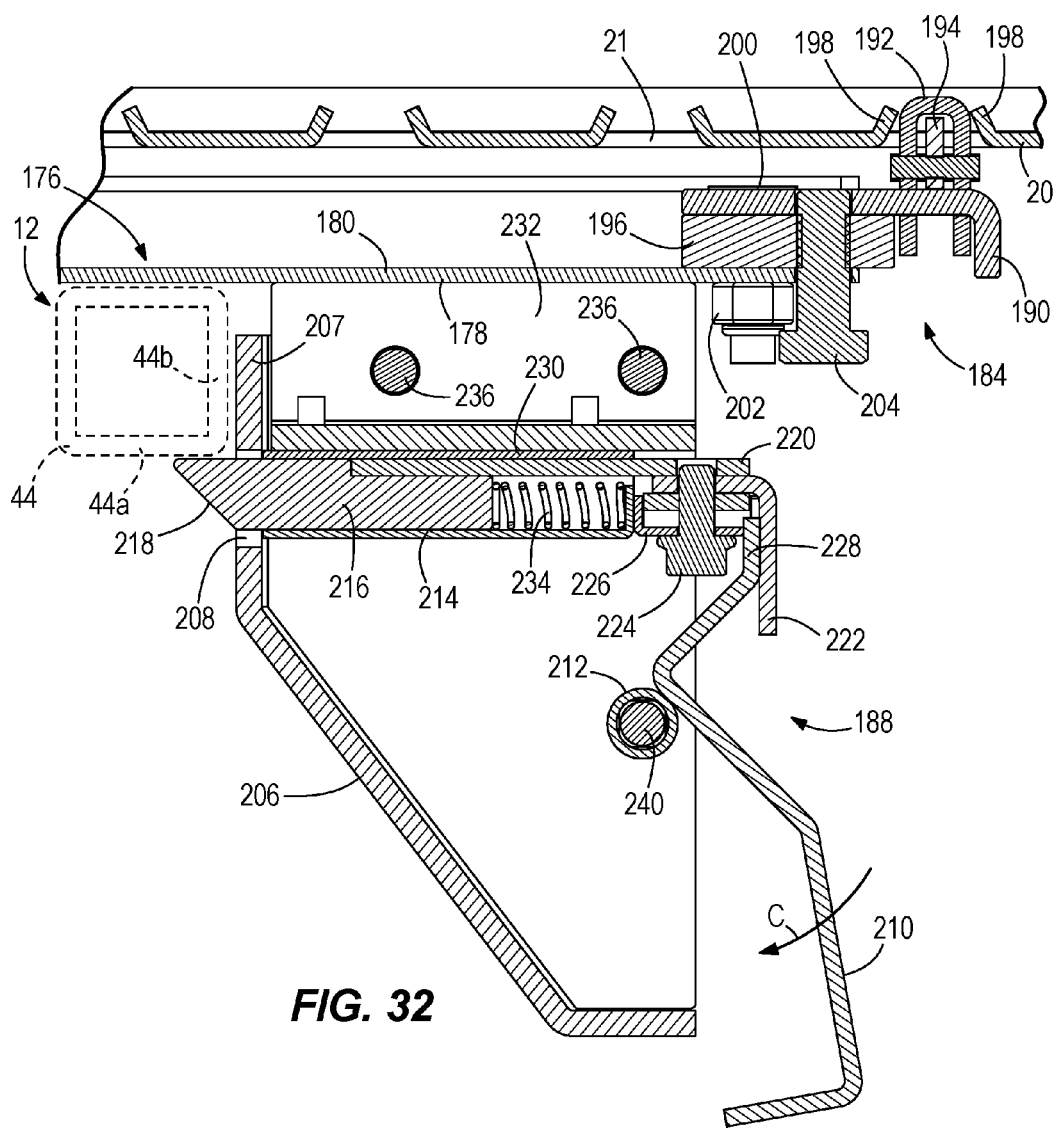
FIG. 32 is an enlarged sectional view of a latch housing bracket taken on line 32-32 of FIG. 30.

Referring now to FIG. 31, each of the mounting bracket assemblies 182, 184 includes a channel lock bracket 190, an E-track connector bracket 192 forming a projection and having a reinforcing member 194 retained therein, and a mounting block 196. As seen in FIG. 32, each end of the horizontal mounting channel 176 is mounted to an E-track connector 20 by locating and engaging one of the E-track connector brackets 192 between inwardly extending flanged walls 198 forming a desired slot 21 for connection. The channel lock bracket 190 is passed through a slot on the E-track connector bracket 192, and the mounting block 196 is positioned between the channel lock bracket 190 and the rear face 180 of the horizontal mounting channel 176. Screws 200 and nuts 202 are used to fix channel lock bracket 190 and the mounting block 196 to the horizontal mounting channel 176. In addition, a mounting bracket screw 204 is passed through the horizontal mounting channel 176 at an end thereof and screwed into the mounting block 196 and the channel lock bracket 190.

As also seen in FIG. 32, each of the latch housing assemblies 186, 188 include a latch housing bracket. 206 having an opening 208 formed therethrough, a latch release bracket 210 fixed to a pivot tube 212 which together form a release arrangement, a latch element housing 214, and a latching element 216 formed with a beveled end 218 and fixed to a guide member 220. The latch element housing 214, the latch element 216 and the guide member 220 define a latch assembly. The guide member 220 receives one end of an angle bracket 222, and a screw 224 is passed through a retainer 226 and threaded into the angle bracket 222 so that one end 228 of the latch release bracket 210 is retained between the angle bracket 222 and the retainer 226. The latch element housing 214 is fastened to and holds the latching element 216 and the guide member 220 against a face plate 230 of a mounting bracket 232 fixed to the front face 178 on an end of the horizontal mounting channel 176. A spring 234 is positioned between an inner end of the latching element 216 and an inner end of the latch element housing 214, and is normally biased to force the beveled end 218 of the latching element 216 out of the opening 208 of the latch housing bracket 206.

Each latch housing bracket 206 covers the latch element housing 214, the latching element 216 and the guide member 220, and is fastened by two bolts 236 to the mounting bracket 232 using nuts 237 (FIG. 31). Each latch housing bracket 206 also receives the pivot tube 212 which is secured to the latch housing bracket 206 by a bolt 240. By design, pushing the latch release bracket 210 in the direction of the arrow C in FIG. 32 causes the pivot tube 212 to turn about a vertical pivot axis of the bolt 240. In turn, this causes the end of the latch release bracket 210 to move against the angle bracket 228 causing the guide member 220 and the latching element 216 to slide along face plate 230 and compress the spring 234 withdrawing the beveled end 218 of the latching element 216 into the latch housing bracket 206. Release of the latch release bracket 210 automatically returns the latching element 216 to the position shown in FIG. 32 due to the released force of the compressed spring 234.

In an exemplary use, an E-track connector 20 is fixed to a support surface, and the horizontal mounting channel 176 is fixed to the E-track connector 20 by the mounting bracket assemblies 182, 184 while the latch housing assemblies 186, 188 are mounted on opposed ends of the horizontal mounting channel 176. When it is desired to secure a cart to the E-track connector 20, the cart is pushed towards the support surface. Rear members on opposed side walls of the cart move between the latch housing assemblies 186, 188 and act to momentarily force the biased latching elements 216 into the latch housing brackets 206 after which the latching elements 216 snap back to lock the cart in place. Such locking is represented by the latch element 216 engaging with a forward facing surface 44a of a rear member 44 of the cart 12 as shown in phantom lines on FIG. 32. A wall 207 of the latch housing bracket 206 lies between an inwardly facing surface 44b of the rear member 44 of the cart 12 and an inner edge of the mounting bracket 232.

FIGS. 33 and 34 illustrate a third exemplary embodiment of the mounting and latching arrangement 10". In this embodiment, the latch housing assemblies 186, 188 are identical to those described above. However, the mounting bracket assemblies 182', 184' are modified and are similar to the mounting bracket structure shown in FIG. 7. For example, mounting bracket assembly 184' includes a mounting plate (not shown) which is integrally constructed with a projection in the form of a flange element 84', and the mounting plate is designed to be slideably retained behind the rear face 180 of the horizontal mounting channel 176. Each end of the horizontal mounting channel 176 has slots 92' and bolts 76' are passed through the slots 92' and threaded into holes of the mounting plate to secure the opposed ends of the horizontal mounting channel 176 to the E-track connector 20. Operation of the latching housing assemblies 186, 188 is identical to that described above, as shown by the locking of the cart 12' in FIGS. 34 and 35.

Thus, the present disclosure provides a convenient mounting and latching arrangement for securing carts to a support surface. The mounting and latching arrangement includes the mounting bracket assembly, such as shown at 64, 66, 182, 184, 182', 184', adapted to be mounted to a support surface, such as the E-track connector 20. The mounting bracket assembly is connected with, such as by the elongated mounting channel 62, 176, engagement structure, such as shown at 104a, 104b, 186, 188. The engagement structure is configured for selective engagement and disengagement with the cart 12, 12', and adapted for locking and unlocking the cart relative to the support surface.

In the present disclosure, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and devices. Various equivalents, alternatives and modifications are possible within the scope of the appended claims.

What is claimed is:

1. A mounting and latching arrangement for locking and unlocking a cart relative to a support surface, the mounting and latching arrangement comprising:
    an elongated mounting channel having opposed ends configured with mounting bracket assemblies adapted to be secured to the support surface, and one of engagement structure and latching structure located between the mounting bracket assemblies and configured for selective engagement and disengagement with the cart for enabling locking and unlocking thereof relative to the elongated mounting channel;
    wherein each of the mounting bracket assemblies has a projection which is engageable with a wall structure forming a slot in an E-track connector adapted to be secured to the support structure.

2. The mounting and latching arrangement of claim 1, wherein the engagement structure includes striker structure and the cart includes a latch assembly configured for locking and unlocking with the striker structure.

3. The mounting and latching arrangement of claim 2, wherein the latch assembly is operatively connected with a release arrangement configured for unlocking the latch assembly from the striker structure.

4. The mounting and latching arrangement of claim 1, wherein the latching structure includes a latch housing assembly secured to the mounting channel inwardly of each of the mounting bracket assemblies and provided with a latch element configured for engagement and disengagement with the cart.

5. The mounting and latching arrangement of claim 4, wherein a release arrangement is pivotally connected to the latch housing assembly, and is operably connected with the latch element for unlocking the latch element from the rear member of the cart.

6. A mounting and latching arrangement for locking and unlocking a cart relative to a support surface, the cart having at least a base frame and a pair of opposed side members mounted on the base frame, the mounting and latching arrangement comprising:
    at least one pair of spaced apart elongated vertical mounting channels, each vertical mounting channel having opposed ends provided with mounting bracket assemblies adapted to be attached to the support surface, each vertical mounting channel further including a lead-in guide element configured for guiding engagement with one of the side members of the cart and a slam latch bracket configuration provided with striker structure; and
    a latch assembly provided on each of the side members of the cart and configured for selective engagement with and disengagement from the striker structure on one of the vertical mounting channels, the latch assembly being operatively connected with a release arrangement, wherein movement of the cart towards and between the vertical mounting channels causes guiding engagement of the side members of the cart with the lead-in guide elements and locking engagement between the latch assemblies on the side members and the striker structure on each of the vertical mounting channels to secure the cart relative to the vertical mounting channels, and actuation of the release arrangement on the side members enables unlocking disengagement between the latch assemblies and the striker structure to free the cart from the vertical mounting channels.

7. The mounting and latching arrangement of claim 6, wherein each mounting bracket assembly includes a face plate fixed to the vertical mounting channel and provided with a first flange adapted to engage wall structure of a first slot formed in an E-track connector.

8. The mounting and latching arrangement of claim 7, wherein each mounting bracket assembly further includes a movable plate configured for sliding movement relative to the face plate and provided with a second flange adapted to engage wall structure of a second slot formed in an E-track connector, the movable plate also being provided with a fin projecting therefrom.

9. The mounting and latching arrangement of claim 8, wherein a side plate is fixed to the vertical mounting channel and receives the first flange.

10. The mounting and latching arrangement of claim 9, wherein a tension bolt extends through the side plate and is threaded into the fin such that turning of the tension bolt causes sliding of the movable plate relative to the face plate and relative movement of the first flange and the second flange which are adapted to grip the wall structures of the first slot and the second slot on the E-track connector.

11. The mounting and latching arrangement of claim 6, wherein the lead-in guide element projects from each vertical mounting channel, and is configured with opposed converging side surfaces.

12. The mounting and latching arrangement of claim 6, wherein the slam latch bracket configuration includes a pair of slam latch brackets projecting forwardly in side by side relationship from each vertical mounting channel.

13. The mounting and latching arrangement of claim 12, wherein each of the slam latch brackets include a bent guide plate configured to guide each latch assembly prior to the locking engagement between the latch assemblies and the striker structure.

14. The mounting and latching arrangement of claim 12, wherein the striker structure includes a striker bolt fixed on each of the slam latch brackets.

15. The mounting and latching arrangement of claim 6, wherein each latch assembly is retained in a latch bracket having a first plate fixed to a vertical member of one of the opposed side members of the cart, and a second plate configured to engage the vertical mounting channel.

16. The mounting and latching arrangement of claim 15, wherein the release arrangement is located on each of the opposed side members of the cart and includes a spring biased elongated rod extending between the latch bracket and a handle located at an end of each of the opposed side members of the cart.

\* \* \* \* \*